March 1, 1960 H. L. DEMOREST ET AL 2,926,627

APPARATUS FOR PERFORMING WORK MOTIONS AUTOMATICALLY

Filed July 13, 1955 8 Sheets-Sheet 1

INVENTORS
HOWARD L. DEMOREST
ROBERT W. FRYKMAN
GEORGE C. KELLY
GLENN R. ROSE

BY

Stuart R. Peterson ATTORNEY

INVENTORS
HOWARD L. DEMOREST
ROBERT W FRYKMAN
GEORGE C. KELLY
GLENN R. ROSE

BY

Stuart R. Peterson ATTORNEY

March 1, 1960 H. L. DEMOREST ET AL 2,926,627

APPARATUS FOR PERFORMING WORK MOTIONS AUTOMATICALLY

Filed July 13, 1955 8 Sheets-Sheet 3

INVENTORS
HOWARD L. DEMOREST
ROBERT W FRYKMAN
GEORGE C. KELLY
GLENN R. ROSE

BY

Stuart R. Peterson ATTORNEY

APPARATUS FOR PERFORMING WORK MOTIONS AUTOMATICALLY

Filed July 13, 1955 8 Sheets-Sheet 4

INVENTORS
HOWARD L. DEMOREST
ROBERT W. FRYKMAN
GEORGE C. KELLY
GLENN R. ROSE
BY
Stuart R. Peterson ATTORNEY INVENTORS
HOWARD L. DEMOREST
ROBERT W. FRYKMAN
GEORGE C. KELLY
GLENN R. ROSE
BY
Stuart R. Peterson ATTORNEY

APPARATUS FOR PERFORMING WORK MOTIONS AUTOMATICALLY

INVENTORS
HOWARD L. DEMOREST
ROBERT W. FRYKMAN
GEORGE C. KELLY
GLENN R. ROSE
BY
Stuart R. Peterson ATTORNEY

APPARATUS FOR PERFORMING WORK MOTIONS AUTOMATICALLY

INVENTORS
HOWARD L. DEMOREST
ROBERT W. FRYKMAN
GEORGE C. KELLY
GLEN R. ROSE
BY
Stuart R. Peterson ATTORNEY

APPARATUS FOR PERFORMING WORK MOTIONS AUTOMATICALLY

Filed July 13, 1955 8 Sheets-Sheet 8

INVENTORS
HOWARD L. DEMOREST
ROBERT W. FRYKMAN
GEORGE C. KELLY
GLENN R. ROSE.
BY
Stuart R. Peterson ATTORNEY United States Patent Office 2,926,627

Patented Mar. 1, 1960

2,926,627

APPARATUS FOR PERFORMING WORK MOTIONS AUTOMATICALLY

Howard L. Demorest, Robert W. Frykman, and George C. Kelly, Minneapolis, and Glenn R. Rose, St. Paul, Minn., assignors to General Mills, Inc., a corporation of Delaware Application July 13, 1955, Serial No. 521,782

36 Claims. (Cl. 118—11)

This invention relates generally to an automatic machine and method for performing work motions in accordance with a pre-established schedule or program, and pertains more particularly to apparatus and a method of this character having especial utility in the enameling of such articles as bathtubs and the like.

One important object of the invention is to provide a machine and a method appurtenant thereto capable of accurately recording work motions by merely running through one complete work cycle under the control of a human operator. More specifically, it is an aim of the invention to achieve the foregoing end in an extremely economical and facile fashion, the invention contemplating the utilization of one or more (depending upon the complexity of the pattern of desired work motions) record blanks having a metallized surface thereon and a backing of electrically non-conducting material. Derivatives of the original or pilot motions are obtained and these derivatives are used to vaporize electricallly some of the metallized surface leaving a narrow path or trace of exposed insulating material which is in an analog form. It is this trace that is used in conjunction with the flanking metallized areas in continuously charting the subsequent course of the work performing tool.

Another object of the invention is to employ an electrical pick-up head in spaced relation with the prepared record, the spacing of the head from the record assuring high fidelity playback during numerous and repeated work cycles without record deterioration. In this connection the invention also has in view the accomplishment of the recording and playback operations with relatively low frequency signals, the frequency employed being in the power range in contradistinction to higher or radio frequencies. Among the advantages flowing from the use of such a low frequency is an enhanced system ruggedness and concomitant reduction in maintenance costs.

A further object is to provide a system of the aforestated type which is exceedingly versatile in operation, the invention contemplating, for instance, that the apparatus be used either manually or automatically. In this regard, the equipment forming the subject matter of the invention may be used, say, to enamel a bathtub of unique design or shape, that is a custom made one, without recording the movements or if the apparatus has a record made for a previous type of tub in place, the equipment can be adjusted to ignore such a record. Also, if a playback from a recording is underway, a rapid switch to manual operation may be effected should circumstances so dictate. Further, the invention comprehends the recording of, for example, two passes or work cycles, one of which may be preliminary phase and the other a finishing one, either of which may be selected by the attendant.

Yet another feature of the invention is the provision for readily changing records, so that the equipment may be converted from one schedule of automatic operations to another.

A still further object resides in the machine's ability to be operated at a selected low speed or speeds during a recording cycle which will permit the exercise of greater than ordinary care and the accomplishing of high quality work not always possible at high recording rates, provision being made for playing back the record thus made at accelerated speeds while automatically preserving the same high quality attributes achieved during the original lower speed recording period.

Other objects will be in part obvious, and in part pointed out more in detail hereinafter.

The invention accordingly consists in the features of construction, combination of elements and arrangements of parts which will be exemplified in the construction hereafter set forth and the scope of the application which will be indicated in the appended claims.

In the drawings:

Figure 5 is a detail of the gear assembly, partly in section, utilized in providing both the tub-tilt and tub-rotation motions;

Figure 12:
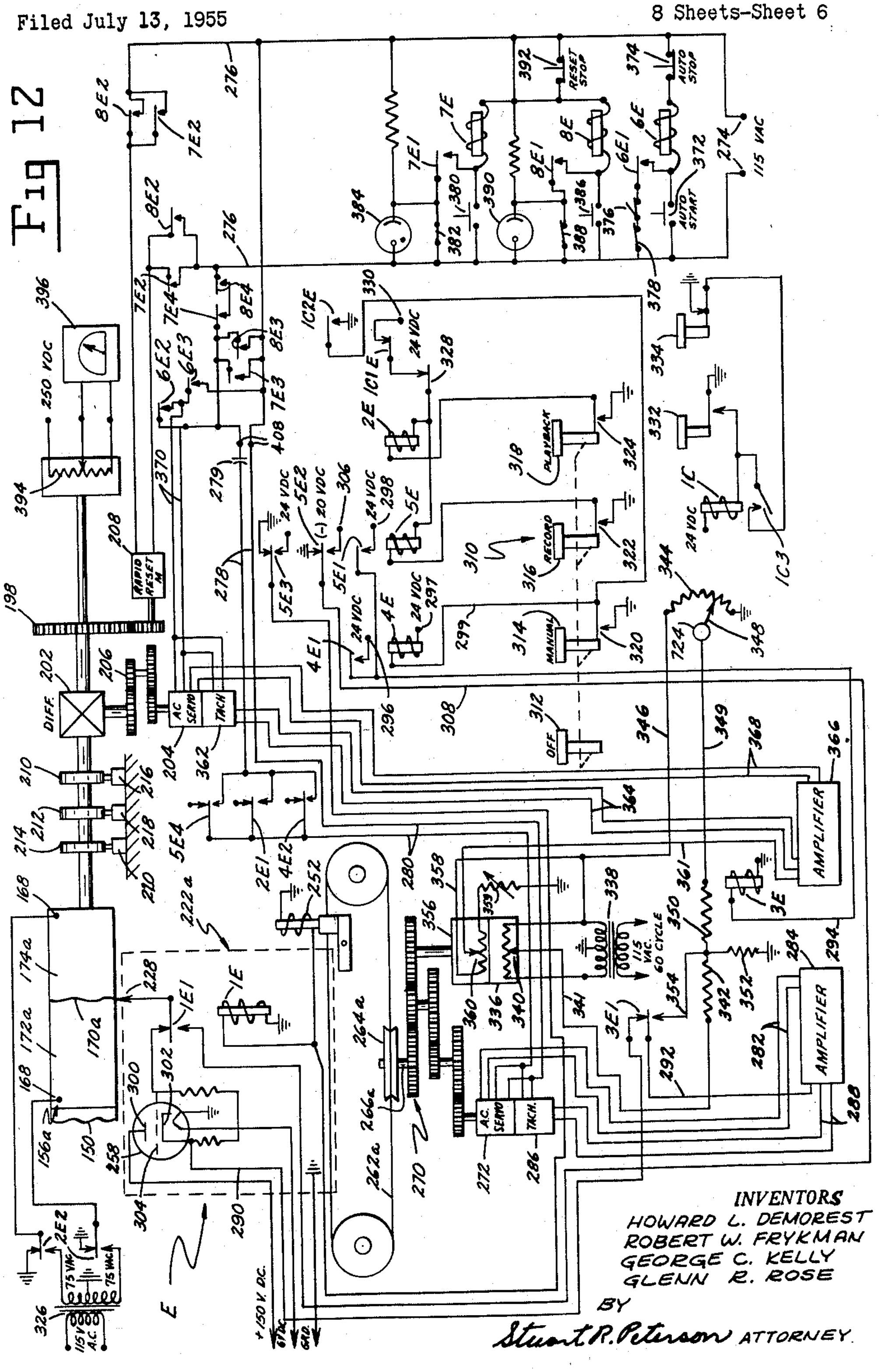
Figure 13:
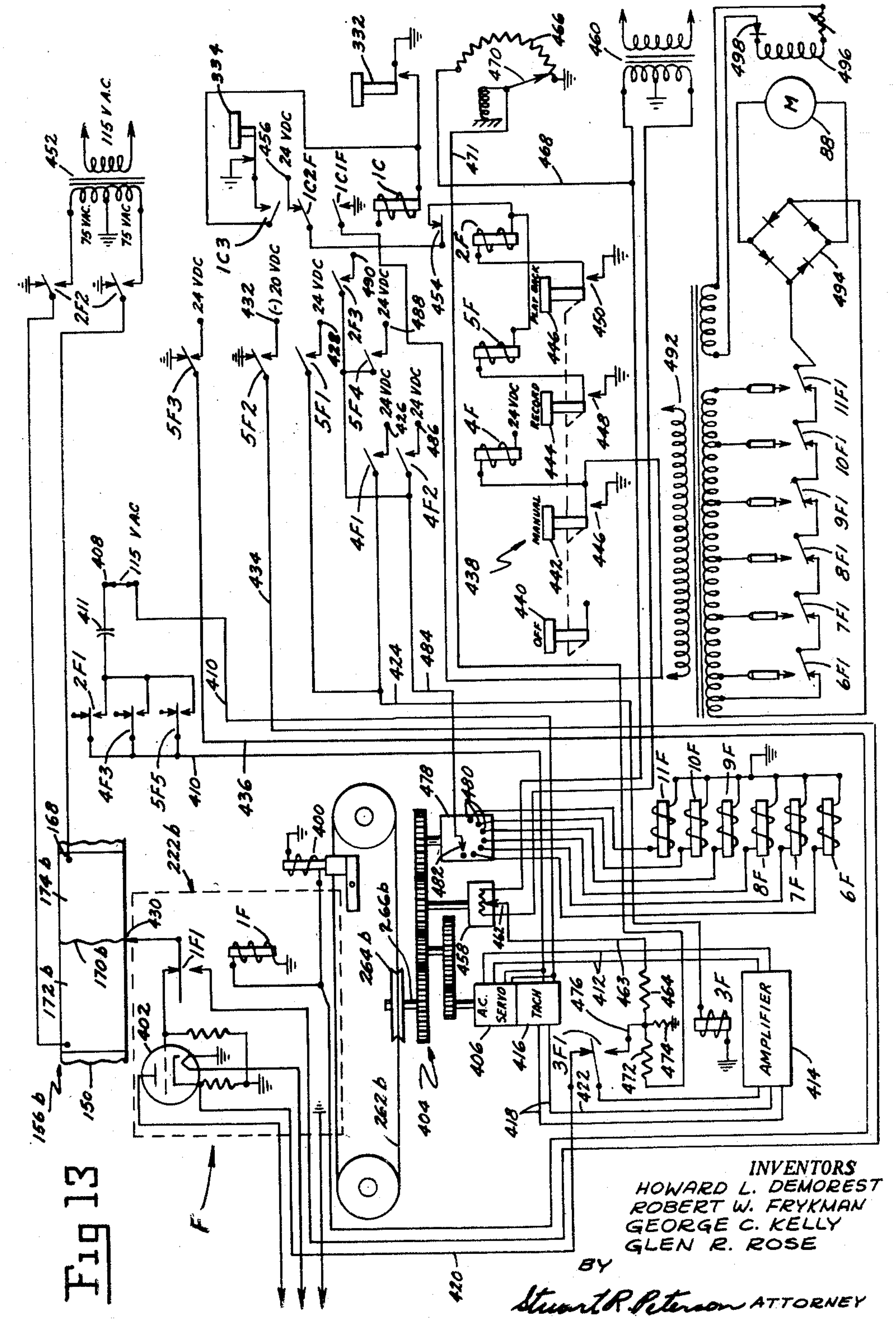
Figure 14:
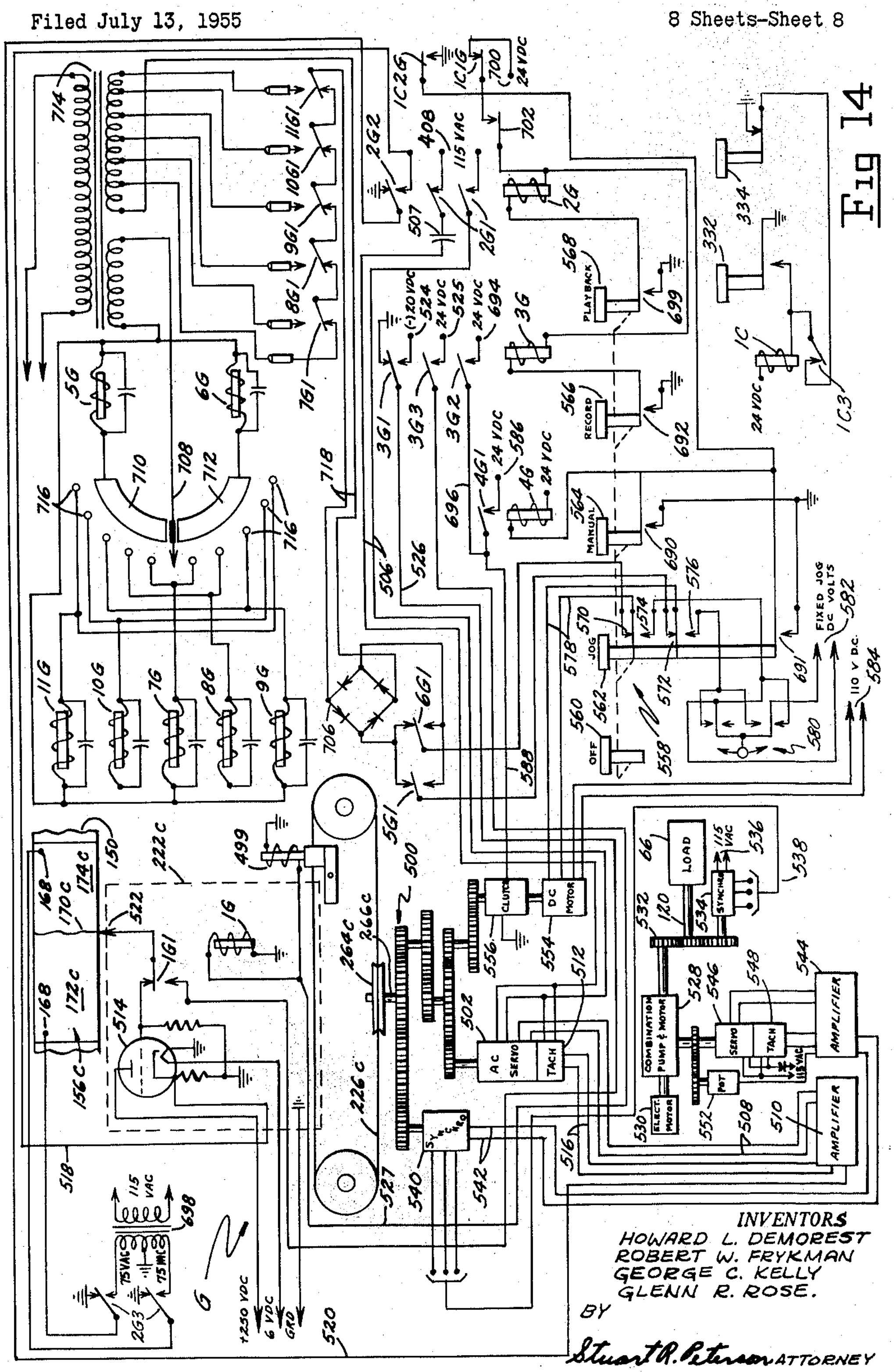

Figure 12 diagrams a circuit arrangement which is instrumental in controlling the drum speed;

Figure 13 is a schematic representation portraying a circuit arrangement for controlling the vibration rate of the dredge arm assembly, and Figure 14 is a further diagram representative of five duplicate circuits that are used in producing certain work performing motions.

Figure 1:
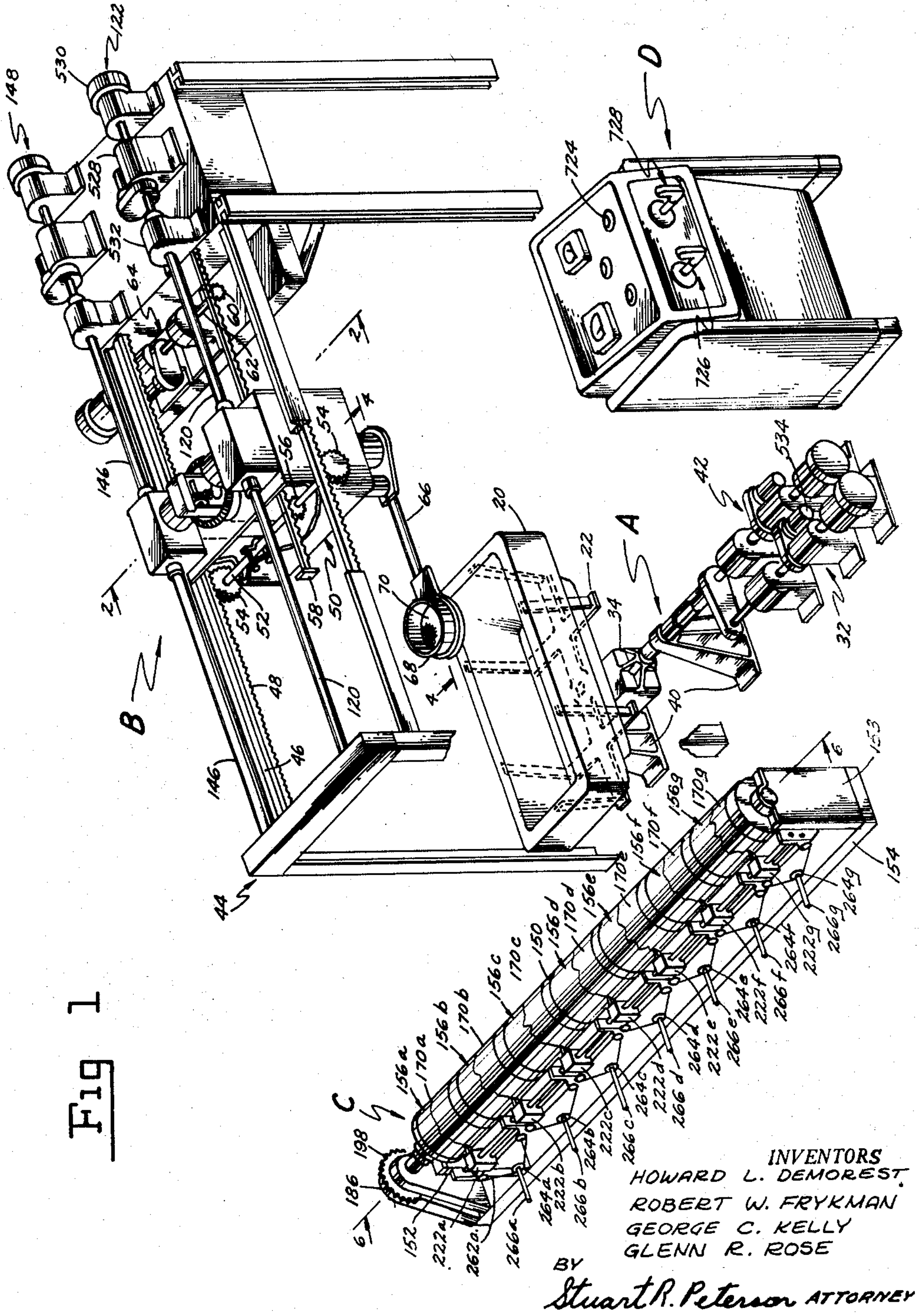
Figure 1 is a perspective view showing the more basic mechanical details of the overall invention.

Referring now in detail to Figure 1, where for simplicity of presenting the ensuing description, the various portions of the overall combination forming the subject matter of the present invention have been designated by different letters. In this regard the universal jig fixture which is employed for rotating and tilting the work is labelled A, the carriage and bridge structure designated by the letter B, the analog drum assembly which carries thereon a number of individual records by the letter C, the console utilized in making the records by the letter D, and the circuit diagrams for controlling the various work performing movements by the letters E, F, and G, these circuit diagrams appearing respectively in Figures 12, 13 and 14. As will be manifested later on, the diagram labelled G is duplicated in the illustrative system to the extent of providing five individual work performing controls.

*Universal jig fixture*

Passing now to the detailed description of the universal jig fixture designated by the character A, it may be first stated that for the purpose of exemplifying the present invention the work to be operated upon has been indicated as being a bathtub 20. This tub is supported on a rotatable spider 22 driven by a stub-shaft 24, the stub-shaft 24 being more clearly presented in Figure 5. At the lower end of the stub-shaft 24 is a pair of bevel gears 26 and 28 which are rotated by reason of a shaft 30. The shaft 30 in turn is mechanically connected to a driving mechanism designated in its entirety by the reference numeral 32. The bevel gears 26 and 28 are enclosed in a gear housing 24 and fixedly attached to the gear housing are hollow shaft sections 36 and 38, these shaft sections issuing in opposite directions. Generally, the shaft sections 36 and 38 are journaled by pedestal bearings 40, and the section 38 is in turn mechanically connected to a second driving mechanism designated generally by the reference numeral 42.

*Carriage and bridge structure*

With regard to the carriage and bridge structure represented by the letter B it will be seen from Figure 1 that this structure includes a frame or mount 44 having a plurality of downwardly extending legs for the support thereof. Further included in the frame 44 is a pair of parallel tracks 46 under which is disposed a gear rack 48. A carriage movable longitudinally along the parallel tracks 46 bears the numeral 50, this carriage having a transverse shaft 52 equipped with a pair of pinions (one at each end thereof) which have been given the numeral 54. These pinions are meshed with the racks 48 and by means of another pinion 56 on the transverse shaft 52 the carriage may be moved back and forth. Aiding in this reciprocal movement is a floating rack 58 engaged with pinion 56 and also engaged with another pinion 60 carried at the end of a drive shaft 62. The drive shaft 62 is connected to a driving mechanism 64 which is similar to the earlier described driving mechanisms 32 and 42.

Since it is contemplated that the invention will find utility in the automatic enameling of various articles, the invention includes a dredge arm assembly 66 supported by and movable with the carriage 50. Included as a part of the dredge arm assembly 66 is a frit retainer 68, and as will be seen from Figure 4 the frit retainer is bottomed by a screen 70 supported by a screen ring 72. Also comprising the dredge assembly is what might be termed an outer tube 74 which is secured, as by welding, to the frit retainer 68. Reciprocally mounted within the outer tube 74 is an inner tube 76, the reciprocation being permitted by reason of a pair of supporting bushings 78 which act as guide bearings for the tube 76. As clearly depicted in Figure 4, the screen ring 72, which carries the screen 70, is fixedly secured to the inner tube 76 and hence is reciprocal therewith. Through the instrumentality of a coil spring 80 the inner tube 76 is biased toward the left when viewed in Figure 4. For the purpose of repeatedly urging the inner tube 76, and of course the screen 70, to the right to overcome the bias of the coil spring 80 is a tappet 82 engageable by a cam or eccentric 84 attached to the lower end of a cam shaft 86. The cam shaft 86 is rotated by reason of a D.C. motor 88 mounted on an arm or platform 90, the arm or platform 90 also serving to support the remainder of the dredge arm assembly 66.

As already mentioned the dredge arm assembly 66 is movable in unison with the carriage 50 that travels horizontally along the tracks 46. To this end the carriage 50 has depending therefrom a vertical column 92, as can be observed by referring to Figure 2. The depending column 92 is guided vertically by virtue of a plurality of guide rollers 94. In order to move the column 92 upwardly and downwardly with respect to the carriage 50 a vertical rack 96 is fixed to the column and is engaged by a pinion 98. The pinion 98 is rotatable with a shaft 100 which shaft has at its opposite end a bevel gear 102. The bevel gear 102 in turn is meshed with another bevel gear 104 on a relatively short shaft 106. Still another bevel gear 108 is meshed with a large or ring bevel gear 110. The ring bevel gear 110 is driven by a bevel gear 112 disposed on a shaft 114, the shaft 114 being driven by a bevel gear 116 meshed with another bevel gear 118. The hereinbefore enumerated bevel gears form a rather elaborate gear train which is driven by a splined shaft 120 extending through the bevel gear 118. By reason of the splined association, the carriage 50 is permitted to move along its tracks 46 without interference and the shaft 120 may be driven by a driving mechanism 122 which is situated on a stationary portion of the frame 44. A rotatable column 124 larger in diameter than the column 92 encircles the column 92, the column 124 having fixedly secured thereto at its top end a bearing plate 126. The bearing plate 126 is provided with a downwardly facing groove and the ring gear 110 is equipped with an upwardly directed tongue 128, the circular tongue and groove arrangement permitting relative rotation between the ring gear 110 and bearing plate 126. Assisting in the achievement of this relative rotation is a bearing 130. A cylindrical casing 132 forming a fixed part of the carriage 50 encircles the column 124. By reason of a pair of bearings 134 and 136 the column 124 can rotate relative to the entire carriage assembly. However, at this stage of the description it is important to understand that the large bevel gear 110 is free to rotate independently of the column 124.

The column 124, together with the column 92 and the dredge assembly 66, can be rotated together, since the bevel gears 102 and 104 are supported on the bearing plate 126 which plate as already stated is fixed to the column 124. Accordingly, a gear 138 is affixed to the rotatable column 124 and by means of an intermediate or idler gear 139 engaged with a drive gear 140 disposed at the lower end of a vertical shaft 141 the column 124 is rotated when the vertical shaft 141 is rotated. In order to rotate the shaft 141 there is fixedly disposed at its upper end bevel gear 142 which is meshed with another bevel gear 144, the latter bevel gear being free to move along on its splined shaft 146. The splined shaft 146 is similar to the shaft 120. However in regard to the shaft 146 it will be noted from Figure 1 that a driving mechanism 148 identical to the driving mechanism 122 is utilized in causing rotation of the splined shaft, which as already indicated, results in the rotation of the gear 138 and the column 124. Any rotation of the column 124, owing to the rotational freedom stressed in the preceding paragraph, takes place solely without regard to what is happening via the gear train of which the bevel gear 110 is a part.

*Specific work performing motions*

From the foregoing it will be recognized by way of review that the driving mechanism 32 is responsible for tilting the tub 20 about a horizontal axis and the driving mechanism 42 is responsible for rotating the tub about a vertical axis. In addition to the tub rotations the driving mechanism 64 produces a horizontal movement of the carriage and consequently the dredge assembly mechanism 66 can be moved longitudinally with respect to the tub 20. Still further the dredge assembly 66 can be moved up and down by reason of the driving mechanism 122 whereas a horizontal or swinging movement of the dredge arm is effected by virtue of the driving mechanism 144. Through the instrumentality of these five driving mechanisms it will be appreciated that the entire surface of the tub 20 may be covered with enameling powder during the operation of the equipment described.

*Analog drum assembly*

However, it is desired that these various work performing movements, which are necessary to cover completely the surface of the tub 20, be accomplished in an automatic fashion. Therefore the analog drum assembly C will now be described in detail. It will be observed from Figure 1 that the drum assembly includes a drum 150 mounted for rotation on pedestals 152 and 153, these pedestals finding support on a base plate 154. Since in addition to the five work performing motions outlined in the preceding paragraph there is desired to be a control of the drum speed and also a control of the vibration rate of the dredge arm assembly 66, there developes a need in the exemplified construction for a total of seven records in order to accomplish these various movements in an entirely automatic manner. Thus it can be seen from Figure 1 that the drum 150 is provided with seven records designated **156*a*, 156*b*, 156*c*, 156*d*, 156*e*, 156*f*, and 156*g*. For greater clarity of the record construction, attention is now directed to Figures 6 and 7. From these two figures it can be noted that the record 156*a* there pictured consists of a base of insulating material which in the present instance is anodized aluminum. Forming the outer face of the record is a zinc coating 160 which may be applied to the anodized aluminum 158 as by well known evaporation techniques. Through the agency of the zinc or metal coating 160 the record 156*a*, as well as the other records already briefly alluded to, have provided thereon an electrically conductive surface. More will presently be said concerning the utilization of this metallized surface in conjunction with the non-electrical or insulating base provided by the anodization of the aluminum 158**.

Figure 8:
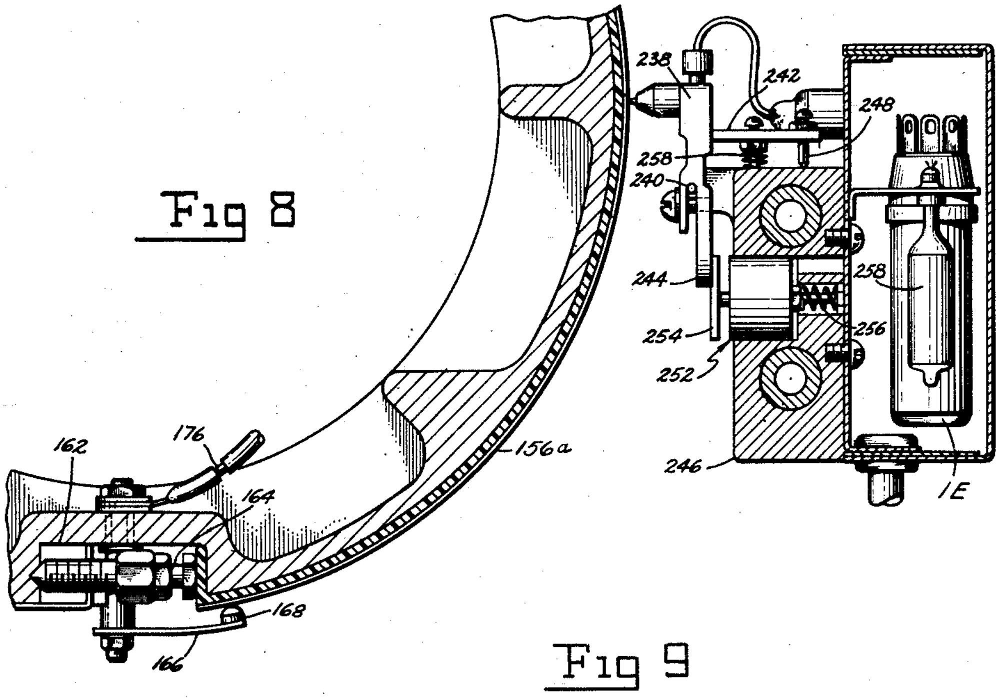
Figure 8 is a quarter sectional view taken in the direction of line 8—8 of Figure 7.

For the purpose of accommodating the opposite ends of these various records **156*a*, 156*b*, 156*c*, 156*d*, 156*e*, 156*f*, 156*g* there is provided in the drum 150 a longitudinal groove 162 (Figure 8). Disposed in this groove and having portions thereof engageable with the end portions of the various records is a plurality of record clamps designated by the numeral 164. One of these clamps is clearly visible in Figure 8. Also visible in Figure 8 is a resilient contact arm 166, there actually being two such arms for each record employed. On each contact arm 166 is mounted a contact 168 and by disposing these contact arms adjacent the marginal edges of the various records 156** it will be appreciated that electrical current may be supplied to each record, all in a manner more fully treated in a later stage of the description.

While more will be said hereinafter concerning the production of the traces it is to be noted at this time that each record 156 is provided with a trace, these traces being designated by the numerals **170*a*, 170*b*, 170*c*, 170*d*, 170*e*, 170*f*, and 170*g*. By having the traces 170, the records are divided into what may be termed separate metallized areas, these various areas being designated by numerals 172*a*, 172*b*, 172*c*, 172*d*, 172*e*, 172*f*, 172*g* and 174*a*, 174*b*, 174*c*, 174*d*, 174*e*, 174*f*, and 174*g***.

As explained above the various contact arms and their contacts 168 are for the purpose of supplying electrical current to the records 156. To achieve this desideratum their conductors 176 (Figure 8) are utilized, these conductors having electrical connection with the various contact arms 166 and being suitably insulated from the drum 150. The conductors 176 may also be viewed in Figure 6 and also appearing in this particular figure is a plug assembly 178, rotatable with the drum 150. Providing a quick type of electrical disconnect is a receptacle 180 which is separable from the plug assembly 178 and is also rotatable in unison with a slip ring and brush assembly 182. As the description progresses it will be made clearer just why a separable or quick disconnect is desired. The slip ring assembly 182 is rotated through the medium of a drive shaft 184 having a square projecting end. The drive shaft 184 is journaled for rotation by a couple of auxiliary pedestal bearings 186 and 188. A collar 190 with a square bore of dimensions coextensive with the squared end on the drive shaft 184 is pressed on to the shaft 184 and lies innerjacent the slip ring assembly so that whenever the collar 190 is rotated the slip ring assembly 182 is of course rotated therewith.

A clutch member 192 equipped with a square shank 194 carries thereon a plurality of slots engageable with a similar number of pins 196 placed on the drum 150. In effect, the clutch member 192 and the pins 196 comprise a disengageable pin clutch and it is by reason of this clutch that the drum 150 is rotated. To drive the drum, a large or bull gear 198 on the drive shaft 184 is driven by a smaller drive gear 200. For simplicity, a train of differential gears 202 used in driving the gear 200 have not been illustrated other than to indicate their enclosure within a housing. For the purpose of driving these differential gears 202 there is a small two phase motor 204, the control of which will be explained more fully hereinafter. Between the differential gears 202 and motor 204 is a preliminary gear reduction train designated by the numeral 206. Also for a purpose clarified more completely hereinafter there is a rapid reset motor 208 for the purpose of "zeroing" or rotatably positioning the drum 150 whenever such a positioning is found desirable or necessary to inaugurate a work cycle.

The drive shaft 184 also carries a plurality of cams 210, 212, and 214. Here again the specific role played by these cams will be dealt with more fully when the various control features forming an important part of the instant invention are considered. However, it might be pointed out at this time that these several cams 210, 212, and 214 actuate switches 216, 218, 220.

Figure 9:
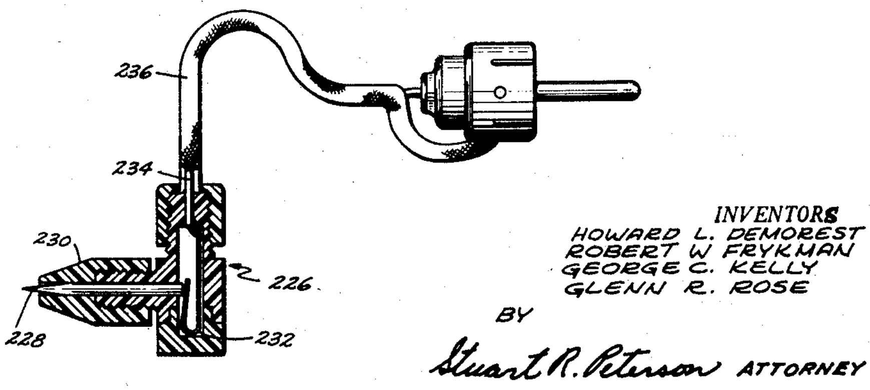
Figure 9 is a detail view, partly in section, showing the structural makeup of the needle assembly which is part of the pickup head more fully shown in Figure 8.

In order to sense changes in direction of the various traces **170*a*, 170*b*, 170*c*, 170*d*, 170*e*, 170*f*, and 170*g* a similar number, that is, seven pickup or controller heads labelled 222*a*, 222*b*, 222*c*, 222*d*, 222*e*, 222*f*, 222*g* are employed. These pickup heads are mounted for movement along one side of the drum 150 by means of a pair of vertically spaced guide tubes or bars 224. Each pickup head 222 is provided with a pickup needle assembly, best seen in Figures 8 and 9, which assembly bears the numeral 226 and comprises a needle or stylus 228 of quite small diameter, the diameter being in the neighborhood of only 0.058 inch. Encompassing and gripping the needle or stylus 228 in each instance is a needle housing subassembly 230 which is coated with a silver compound, the purpose of such a coating being to minimize the amount of "noise" or stray capacitance which will adversely affect the pickup signal. Within the needle housing subassembly there is mounted a contact spring which exerts a pressural force against the needle or stylus 228 of sufficient intensity for the purpose of making good electrical contact. Connecting with the contact spring 232 is a pickup wire 234 having copper shielding 236 circumposed thereabout and having electrical connection with the silver compound distributed on the outer surface of the otherwise insulated needle housing 230**.

From Figure 8 it will be discerned that the pickup needle assembly 226 is received by a yoke member 238 rendered pivotal by a pin 240. The yoke member 238 is comprised of a laterally extending arm 242 and a downwardly extending arm 244. The pin 240 mounts the yoke for pivotal movement relative to a body or base 246. The laterally extending arm carries an adjustable stop element labelled 248 and this stop element is engageable with the upper portion of the body 246 thus governing or limiting the amount of pivotal movement of the yoke 238 about the pin 240 in a clockwise direction. Sandwiched between the arm 242 and the body 246 is a coil spring 250 which is instrumental in applying just the right amount of recording pressure since the spring is susceptible of adjustment. The action provided by the coil spring 250, however, may be readily overcome by reason of the de-energization of a solenoid 252, this solenoid having a movable armature 254 which is urged in the direction of the downwardly extending arm 244 by means of a spring 256. It might be explained that the spring 256 has a greater spring constant than the spring 250 and consequently easily overcomes the action of the spring 250 whenever the solenoid is deenergized. On the other hand, when the solenoid is energized the armature 254 is retracted and the retraction of the armature compresses the spring 256 thus removing its effect from the yoke 238 and leaving only the action of the spring 250 for the purpose of providing the desired recording pressure. Further, it should be pointed out that the spring 256, which is responsible for the withdrawal of the needle or stylus 228 from the record, does so only to the extent permitted by the stop 248. In actual practice the stop 248 will be set so that the withdrawal distance amounts to approximately 0.010 inch.

Because of the foregoing described need for shielding (only the extreme tip of the needle or stylus 228 being exposed) it follows that the wire 234 should be as short as possible and for this reason a vacuum tube 258, which plays a very important part in the picking up of the proper signal, be located as close to the needle tip as possible. Therefore, a vacuum tube similar to the tube 258 is mounted on each movable head 222, there actually being seven of these heads as already stated. Also forming a part of the pickup head is a relay 1E for connecting the vacuum tube in a circuit with the wiring set forth in Figure 12.

Inasmuch as the various heads 222 must be moved relative to the various records 156 in order to track the traces 170, there is shown collectively in Figure 1 a plurality of cords or wires for moving these heads, these cords or wires being designated by the numerals **262*a*, 262*b*, 262*c*, 262*d*, 262*e*, 262*f*, 262*g*. The cords are in turn trained over drive pulleys 264*a*, 264*b*, 264*c*, 264*d*, 264*e*, 264*f*, 264*g*, these drive pulleys being driven by means of an equal number of drive shafts 266*a*, 266*b*, 266*c*, 266*d*, 266*e*, 266*f*, 266*g***.

*Analog drum speed control circuit*

Having mentioned the presence of the drive pulley **264*a* and the drive shaft 266*a* an apt introduction to Figure 12 and diagram E constituting figure has been presented. Therefore, attention is now directed to Figure 12 where it is shown that the drive shaft 266*a* is mechanically connected to a gear train 270. The gear train 270 is actuated by a two-phase A.C. servomotor 272. For the purpose of energizing the motor 272 in such a fashion that it will exercise the proper degree of control on the head 222*a* by way of the gear train 270, it will be pointed out that this motor includes a winding which is excited by a constant voltage source 274 via a pair of bus conductors 276 and connecting conductors 278. A capacitor 279 is instrumental in producting a 90° phase relationship with the winding just mentioned and the other winding which, as will presently be stated, is designed to serve as a control winding. Between the capacitor 279 and the conductors 278 is a pair of relay contacts 2E1, these relay contacts being operated by a relay subsequently to be described. Connecting the capacitor directly to the servomotor 272 are additional conductors 280, and with respect to the supply of the control voltage to the control windings of the A.C. servomotor 272, it is to be noted at this time that conductors 282** are employed.

Of such a character so as to furnish both amplification and phase detection is what will be referred to as just an amplifier labelled 284, this amplifier being represented in block form for the purpose of simplifying the involved circuitry. On the same shaft with the A.C. servomotor 272 is a tachometer 286, conductors 288 leading from this tachometer to the amplifier 284. Here again for the purpose of simplification it need only be mentioned that the tachometer in this instance is employed as a rate generator for performing a system stabilizing function. Also introduced or fed to the amplifier 284 is a signal from the vacuum tube 258. It will be recalled that the vacuum tube 258 plays an important role in the pickup of the appropriate signal from the record **156*a*. The signal from the vacuum tube 258, which incidentally is transmitted according to the well known cathode follower principle, is delivered to the amplifier via the conductor 290, relay contacts 3E1 which are controlled by a relay 3E and a conductor 292 leading from the contacts 3E1 to this amplifier 284**.

The power for energizing the relay 3E is supplied via a conductor 294 whenever either of two other relays (subsequently to be referred to) are energized from either a source of electrical supply 296 or source 298, this supply being via contacts 4E1 on a "manual" relay yet to be described or contact 5E1 on a "record" relay still to be described. In passing, it might be mentioned that various sources will be mentioned throughout the following description, and while these sources will be referred to as distinct and separate sources, nonetheless, in actual practice there will be a reduced number of bus bars or connectors which supply such needed power. It is only for the purpose of simplifying the drawings as much as possible that individual sources are referred to inasmuch as by so doing the inclusion of complicating conductors running from a common source is obviated.

As already stated, the signal picked up by the head **222*a* is transmitted to the amplifier according to the cathode follower principle. This principle is old and well known and need not be elaborated upon other than to specify that the tube 258 may be a Raytheon CK-5744 WA tube conventionally comprising a plate 300, a cathode 302 and a grid 304. As shown, the grid 304 is connected directly to the needle 228 but by way of a double-throw contact 1E1 located on the relay 1E which has been referred to as being the relay for connecting or disconnecting the vacuum tube from the circuit E. Further, it is this same relay 1E that when energized connects the needle 228 to a source of writing voltage 306, the writing voltage being on the order of minus 20 volts. This latter connection takes place via the conductor 308 and contacts 5E2 on what is to be referred to hereinafter as "record" relay 5E. In addition to the aforenoted contacts actuatable by the record relay 5E, there are disposed on this relay contacts 5E3 for controlling the energization of the relay 1E and also the solenoid 252. Relay 5E is further equipped with contacts 5E4 paralleling the contacts 2E1. In this way, when it is desired to make a record the energization of the record relay 5E is responsible for energizing the relay 1E so as to impress the negative writing voltage of 20 volts D.C. on the needle 228 and simultaneously to energize the solenoid 252 so that its armature 254 is retracted, leaving the spring 250 free to urge the yoke 238 and the needle assembly 226 in a direction to establish recording contact between the needle 228 and the record 156*a***.

Through the intermediary of a push button selector switch unit designated in its entirety by the reference numeral 310 various operations are possible with the circuitry thus far described. Comprising this switch unit 310 is an "off" button 312, a "manual" button 314, a "record" button 316, and a "playback" button 318. These various buttons are all mechanically interlocked with each other so that only the button which has been depressed is effective and in this way only a particular operation can be accomplished. As its name implies the "off" button 312 is instrumental in taking control away from the other buttons. The "manual" button, also as its name implies, permits the system to be used for manual operation without the system undertaking the recording of any of the work movements. On the other hand, the "record" button 316 is utilized when a record of the various work performing movements is to be made. Still further the playback button is responsible for inaugurating a playback sequence from a record already produced from a recording operation.

So that the respective functions of the buttons enumerated above may be better understood, a detailed description of their associated components will now be undertaken. In this regard a "manual" relay 4E is employed, receiving its energization from source 297 via contacts 320 and conductors 299. To achieve the energization of the manual relay 4E, contacts 320 are closed whenever the manual button 314 is depressed. Contacts 322 are similar to contacts 320 and are mounted for actuation by the record button 316. When these contacts are closed, the relay 3E is automatically energized, but, however, from source 298 via the contacts 5E1. Also carried by the relay 4E are contacts 4E2 paralleling the earlier mentioned contacts 2E1. Further contacts 324 are associated with the playback button 318 and these contacts energize the playback relay 2E when closed.

Figures 6, 7:
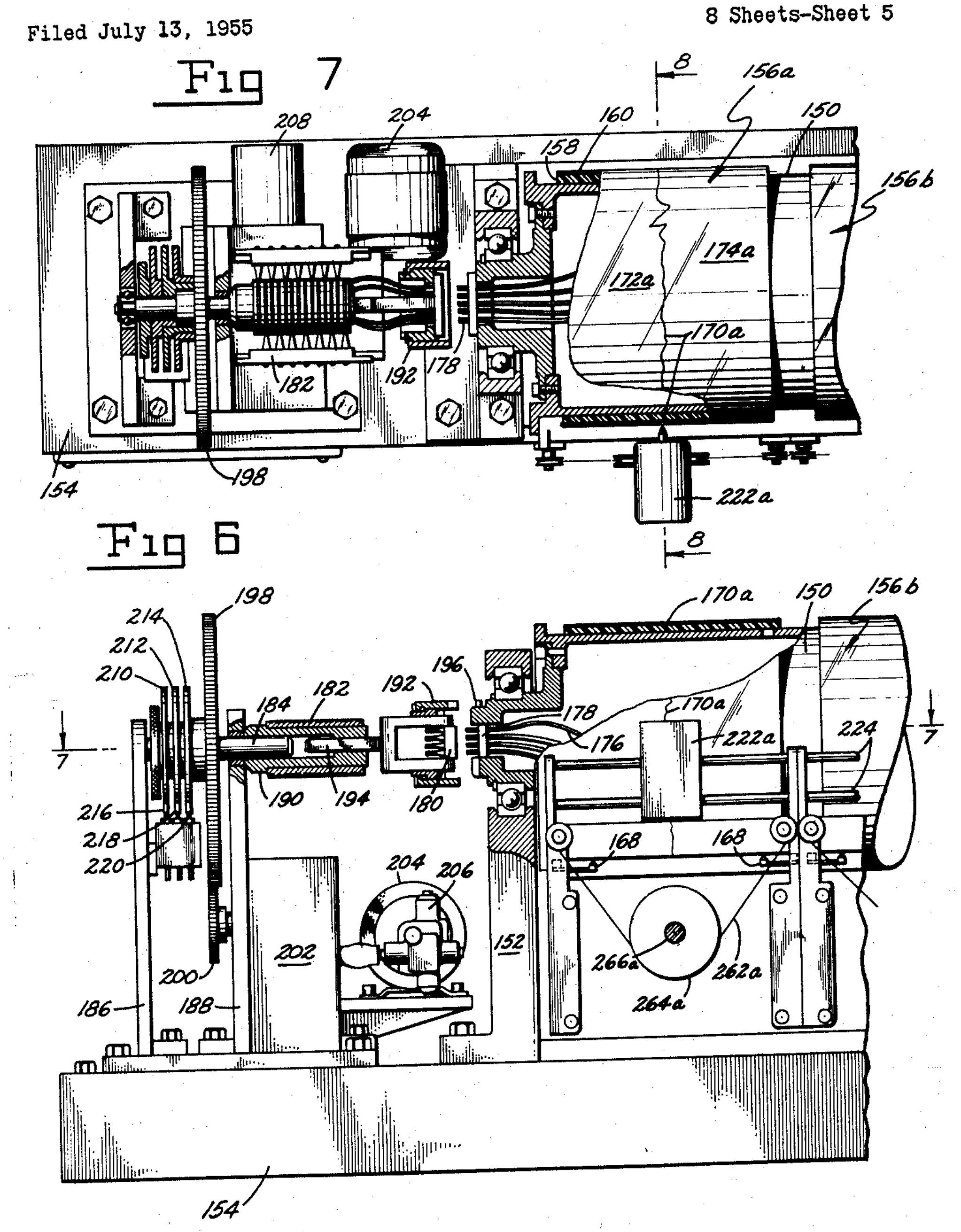
Figure 6 is a fragmentary sectional view of the drum assembly taken in the general direction of line 6—6 of Figure 1.
Figure 7 is a sectional view taken in the direction of line 7—7 of Figure 6.

In addition to closing the constant voltage contacts 2E1 in circuit with the constant voltage winding of servomotor 272, the relay 2E carries contacts 2E2 which apply approximately 150 volts from a source 326 to the metallized areas 172*a*, 174*a* of the record 156*a*. This supply to the metallized areas of the record 156*a* takes place by way of the slip ring assembly 182, as depicted in Figure 6. From the slip ring assembly the supply continues to the record by way of the contacts 168 which bear thereagainst.

The energization of relays 2E and 5E is subject to the closure of contacts 328, these contacts forming a part of cam switch 216. By contouring or notching the cam 210 so that these contacts 328 will be open in the region of the groove 162 (Fig. 8) it can be seen that these two relays, that is, the playback relay 2E and the record relay 5E, are de-energized when the drum 150 has brought the groove 162 into juxtaposition with the pickup head 222*a* and thus the pickup head is rendered ineffectual at this particular moment, the solenoid 252 being de-energized. When this happens, since the contacts 5E3 are in circuit with the solenoid 252 and these contacts 5E3 are closed by the de-energization of relay 5E, it will immediately become apparent that the yoke 238 will be pivoted clockwise by the partial ejection of the solenoid armature 254 owing to the pressure applied thereto by the spring 256. By so doing, the needle assembly 226 is moved in a direction away from the record as can be seen in Figure 8 and this withdrawal of the needle assembly carries with it, of course, the needle 228 so that there is no possibility of damage to the record or needle should a recording operation be attempted.

Attention is now directed to the utilization of a common relay 1C. The function of this relay 1C is to permit the control, whether it be during a recording or playback operation, to be immediately thrown over to manual operation so that the operator, if he wishes, can personally take over the overall operation of the system. With this aim in view, the common relay 1C is equipped with normally closed contacts 1C1E in circuit with the cam switch contacts 328 and a source of power 330. The common relay 1C also has normally open contacts 1C2E thereon for energizing the manual relay 4E whenever the common relay is energized. The way in which the energization of the common relay 1C is effected is by means of a push button switch 332 which may be mounted in any convenient location such as on or adjacent to the console D. Still further, the common relay 1C is provided with holding contacts 1C3, the function of which is to merely assure energization of this relay once the push button switch 332 has been released. In order to de-energize the common relay 1C, even though the holding contacts 1C3 are closed, a preset switch 334 is provided.

More will be said later on, namely during a typical operational sequence, concerning the theory underlying the way in which the error signal is picked up by the needle 228 and transmitted to the amplifier 284 by way of the vacuum tube 258. However, when it is desired to make a recording, in addition to pressing the "record" button 316 certain other manipulations must be performed so that the proper drum speeds are recorded. However, as a prelude to understanding the way in which the manipulations are effective to achieve this desired end, it is to be observed first that a voltage signal is desired which will be in accordance with the position of the pickup head 222*a*. Consequently, a rotary potentiometer 336 is provided which is driven by the gear train 270. An energizing source 338 in the form of a transformer supplies the necessary electrical energy to the potentiometer. By means of a movable brush arm 340 and conductor 341 the signal, which is in accordance with the position of the head 222*a*, is delivered to a resistor 342. Now, with specific reference to the required manipulations, it is to be noted that a manually actuated potentiometer 344 is utilized having a conductor 346 connecting with the source 338. A brush arm 348 is connected by a conductor 349 to a resistor 350. Still another resistor 352 is employed and this last mentioned resistor, together with the resistors 342 and 350, form a T resistor formation. It might be mentioned at this point that the brush arm 348 is so arranged that it will never go to the far end of the potentiometer 344 which movement would impress only a zero potential on the resistor 350. Assurance against such happening may be achieved very simply by either limiting the brush arm movement in the electrical direction of ground or by adding an auxiliary resistor between the potentiometer and ground. At any rate, it will be recognized that the potentiometer 336 is effective to produce one signal and that the manually operated potentiometer 344 produces another signal which is balanced against the signal derived from the potentiometer 336. Any unbalance stemming from these two signals is fed to the amplifier 284 by means of a conductor 354 leading to the contacts 3E1 and from these contacts, which incidentally are closed when conducting the recording operation, the error signal is conveyed to the amplifier by the already referred to conductor 292. It is this error signal, in the present recording situation, that is amplified and the amplified output is impressed on the control windings of the A.C. servomotor 272 so as to operate the gear train 270 and hence the head 222*a* in correspondence with whatever error signal is delivered to the amplifier 284. Thus, movement of the head 222*a* depends on the position to which the potentiometer 344 has been manually adjusted. Since the needle 228 is moved in unison with the head 222*a*, it will be appreciated when the needle is energized by the writing voltage provided from the source 306 the trace 170*a* will be formed in the record 156*a*.

While the circuitry presented in the paragraph above is responsible for positioning the head 222*a* transversely with respect to the record 156*a*, nonetheless the recording is not complete as yet for there must be introduced into the system a rate function and to this end a second potentiometer 356 driven in unison with the potentiometer 336 from the gear train 270 is employed. By way of a conductor 358 this potentiometer is energized from the same source 338 as are the potentiometers 336 and 344. The potentiometer 356 is equipped with a brush arm 360 and conductor 361 by which the signal from the potentiometer 356 is fed to an amplifier presently to be referred to more particularly. The range of this potentiometer, namely for drum "playback" at an accelerated rate, may be shifted due to the presence of a variable resistor 359 in series with said potentiometer. Also, in effecting the desired rate signal a tachometer 362 is employed which is driven in unison with the A.C. servomotor 204 by way of the gear train 206, the differential 202 associated with the drum shaft driving this tachometer in proportion to the drum speed. The tachometer by way of conductors 364 is connected to what will be generally termed a drum drive amplifier 366. The actuating signal or output from the amplifier 366 is transmitted to the control winding of the two phase servomotor 204 via conductors 368. This output or actuating signal from the amplifier 366 serves as the control for the servomotor 204 and as in the situation concerning the A.C. servomotor 272 there is also a constant excitation winding forming a part of the motor 204 which is energized in the present instance by means of conductors 370 having connection with the previously referred to bus conductors 276. In this way the potentiometer 356 provides a signal and the tachometer 362 provides a signal, and as long as these signals are at variance with each other there will be a signal amplified within the amplifier 366 which acts to overcome any difference in such signals by actuating the servomotor 204, either increasing or decreasing the speed thereof so as to drive the drum 150 at the proper or selected rate.

The rapid reset motor 208, referred to briefly sometime back, has especial utility in positioning the drum 150 for the beginning of a work performing cycle. Actually the invention comprehends the dividing of each record 156 into what may best be termed two phases. For instance, one phase might be utilized in performing an enameling operation which is of a preliminary nature, where as the other phase, that is, phase two, might be utilized in conducting a finishing enameling operation. The rapid reset motor 208 will also find utility at other times and therefore a detailed description will now be given with respect to the circuitry pertinent to the operation of this reset motor.

Before describing the circuitry directly concerned with the reset motor 208 it is to be noted that at the righthand side of Figure 12 an automatic "start" button 372 is employed, the closing thereof effecting energization of a "start" relay 6E. Both the starting switch 372 and the relay 6E are in circuit with an automatic stop button switch 374 and these circuit components are in turn energized by means of the bus conductors 276. Operated by the relay 6E are, first of all, hold contacts 6E1. Still further, the relay 6E includes normally closed contacts 6E2 for shorting out the constant voltage winding of the servomotor 204 when the automatic start switch 372 is open. Still further, contacts in the form of contacts 6E3 are carried by the relay 6E, these contacts being normally open but closed by energization of the relay 6E for the purpose of energizing the constant voltage winding on the motor 204 via the conductors 370 to cause its operation and concomitant rotation of the drum 150. The hold contacts 6E1 are in a serial relationship with switch contacts 376 forming a part of the cam switch 218, which switch, incidentally, is intended to terminate the phase one operation, and contacts 378 located on cam switch 220 are intended to terminate the phase two operation, all by cam action.

Concerning the role of the reset motor 208, whenever the drum 150 is to be brought to its phase one starting position a "reset" button 380 is depressed which is in circuit with a phase one relay 7E having thereon hold contacts 7E1. The hold contacts 7E1 are in serial relation with additional contacts 382 on the cam switch 218. These contacts 382 are open only when the cam follower is in the notch provided on cam 212 which notch is in alignment with the phase one position of the drum 150. For the purpose of furnishing electric power to the rapid reset motor 208, contacts 7E2 are in circuit with the motor and the bus conductors 276, closure of these contacts 7E2, through the energization of the relay 7E, impressing the actuating voltage onto the motor 208. At the same time that the bus contacts 7E2 are closed, further contacts 7E3 on the phase one relay 7E are closed for the purpose of shorting out the constant voltage supply to the servomotor 272. Yet additional contacts 7E4 which are normally closed function simultaneously with the closing of the contacts 7E3 to disconnect the constant voltage winding of the servomotor 272. A practical refinement taking place with the opening of the contacts 382 is the lighting of a neon signal light 384.

Now referring to the establishment of a phase two operation, it is to be observed that a "reset" button 386 is in circuit with a phase two relay 8E. The phase two relay 8E is equipped with hold contacts 8E1 which are in a serial relationship with additional contacts 388 on the cam switch 220. These contacts 388 are open only when the cam follower riding against the cam 214 is in radial alignment with a notch signifying the start position for a phase two operation. As with the phase one relay, the phase two relay 8E carries contacts 8E2, these latter contacts being in parallel with the contacts 7E2 so that the energization of the rapid reset motor 208 may be effected whenever these contacts 8E2 are closed. Performing a function similar to contacts 7E3 are contacts 8E3, and performing a function similar to contacts 7E4 are contacts 8E4. A second signal light signifying when the drum is at the beginning of a phase two operation has been designated by the numeral 390.

Since it is within the purview of the foregoing arrangement to stop the reset motor 208 at any desired moment a reset "stop" switch 392 is in a circuit with the electrical components common to both phases one and two and the opening of this switch serves to stop immediately the operation of the rapid reset motor. As a refinement, the drum 150 has rotatively associated with it a potentiometer 394 which functions to feed a signal to a voltmeter 396 calibrated in degrees of rotation with respect to a given point so as to indicate remotely to an observer or attendant the specific position of the drum at any given time.

*Dredge vibration control circuit*

Describing now the dredge vibrating control circuit F, diagrammed in Figure 13, it may be noted at the outset that certain portions of this circuit resemble that presented in circuit E of Figure 12. For example, the circuit F includes a solenoid 400 resembling the solenoid 252 earlier described. Also, there is a vacuum tube 402 and a relay IF for connecting the vacuum tube 402 either in circuit or out of circuit depending upon whether the head **222*b* is to be used for a playback operation or whether a recording operation is to be undertaken. If a playback operation is to be presented then of course the relay IF functions to connect the vacuum tube 402 in circuit so as to establish the desired electrical pickup relationship with the record 156*b***.

A gear train 404 is mechanically connected to a two phase servomotor 406, this servomotor having a constantly excited winding energized from terminals 408 (common to Figs. 12, 13 and 14) via contacts 2F1 and conductors 410. In order to establish a 90° phase relationship there is employed in circuit with these contacts 2F1 a condenser 411. The control winding of the two phase A.C. servomotor 406 is excited via conductors 412 which have electrical connection with an amplifier 414. Thus it will be appreciated that the amplifier 414 is capable of putting out a desired actuating signal which coacts with the constant voltage signal and the variance in relationship between these two signals is instrumental in controlling the direction and speed of the servomotor 406. For the purpose of stabilizing the system a tachometer 416 may be employed and this has electrical connection with the amplifier 414 by way of conductors 418. The signal picked up by the head **222*b* during a playback sequence is fed via a conductor 420 to contacts 3F1 on a relay 3F. From these relay contacts 3F1, the signal is transmitted by way of a conductor 422 to the amplifier 414. The excitation for the relay 3F is supplied by means of a conductor 424 connectable to either of two voltage sources 426 or 428, this connection being through contacts 4F1 on a "manual" relay yet to be described or contacts 5F1 carried by a "record" relay still to be referred to. As in the case of Figure 12 the signals from the vacuum tube 402 is fed to the amplifier 414** in the same identical manner, this manner being as heretofore explained according to the cathode follower principle.

Like the needle 228 there is a needle 430 which is electrically connected to the grid of the vacuum tube 402. The relay 1F, which is responsible for connecting the tube 402 in circuit, controls contacts 1F1 and the de-energization of the relay 1F places these contacts 1F1 in a circuit relationship with the grid of the tube 402, this being the relationship depicted in Figure 13. On the other hand, when the contacts 1F1 are moved in the opposite direction by the relay 1F the vacuum tube 402 is rendered inactive and instead the needle 430 is connected to a writing source 432 which, as in the previous instance, is in the neighborhood of minus 20 volts D.C., this taking place via a conductor 434 and contacts 5F2 on a "record" relay 5F. In addition to the contacts 5F1 and 5F2 this relay 5F carries contacts 5F3 for controlling the energization of the previously mentioned relay 1F and also the energization of the solenoid 400, this being by way of conductor 436. Still other contacts 5F5 on relay 5F parallel the contacts 2F1.

Identical to the push button selector switch unit 310 in the circuit E the present circuit F embraces a push button selector switch unit designated by the numeral 438, this switch unit having an "off" button 440, a "manual" button 442, a "record" button 444 and a "playback" button 446. Depression of the manual button 442 serves to close contacts 446 in circuit with a "manual" relay 4F, thus automatically energizing the relay 3F from the source 426 to the contacts 4F1 and over the conductor 424. Paralleling contacts 2F1 are contacts 4F3 on relay 4F. Contacts 448 are associated with the "record" button 444 and closure of these contacts also automatically energizes the relay 3F but instead of doing so from the source 426 it does so from the source 428 via the contacts 5F1. Playback contacts 450 actuated by the push button 446 serve to energize a "playback" relay 2F. In addition to closing the control contacts 2F1 leading to the servomotor 406, the relay 2F functions to close the contacts 2F2 thus applying 150 volts to the metallized areas 172B, **174*b*, of the record 156*b*, this taking place from a source 452 in the form of a transformer. As earlier stated, the cam switch 216 visible in Figures 6 and 12 is responsible for assuring discontinuance of a record operation whenever the groove 162 on the drum 150 is rotated into juxtaposition with the recording head. In the present situation this occurs by way of contacts 454 which are a part of the cam switch 216, these contacts de-energizing the "record" relay 5F**.

The role played by the common relay 1C first referred to in the discussion of Figure 12 is also pictured in the present circuit F. However, it might be explained in passing that in actual practice only one such relay 1C is shown and that is the reason why it has been referred to as a common relay. Nonetheless, in addition to the contacts 1C1E already mentioned the common relay carries contacts 1C2F which are normally closed and are in circuit with the cam switch contacts 454 and a voltage source 456. Further contacts 1C1F corresponding to the contacts 1C2E are carried by the common relay for the purpose of energizing the "manual" relay 4F whenever the common relay is energized. Another common element, that is an element common to both Figures 12 and 13, resides in the push button 332 and it might be pointed out in passing that this push button has already been referred to in conjunction with Figure 12. Still other contacts are carried by the relay 1C and these contacts, while depicted again in Figure 13 in the form of contacts 1C3, nonetheless are contacts that have been referred to. Also the preset switch 334 appears again in Figure 13.

In recording the dredge vibrating rate, certain components, of course, are needed and these particular components will now be dealt with. First of all, it is to be observed that a rotary potentiometer 458 is driven by the gear train 404, this potentiometer being supplied from an energizing source 460 and having a brush arm 462 and conductor 463 leading to a resistor 464. The rotary potentiometer 458 serves the purpose of providing a voltage output signal which is in accordance with the particular position assumed by the head **222*b*. However, in order to effect a change in the position of the head 222*b*, a manual potentiometer 466 is utilized, this potentiometer also being shown mechanically in Figure 10. The particular way in which the manual potentiometer 466 is to be operated will be explained more fully later on. At this time, though, it is to be discerned that a conductor 468 is instrumental in energizing this potentiometer from the energizing source 460. Forming a part of the potentiometer 466 is a brush arm 470 and to the brush arm is connected a conductor 471 having in serial relationship therewith a resistor 472. The resistor 472 is joined electrically to the resistor 464 and to this junction a third resistor 474 is connected. Thus it will be seen that the resistors 464, 472, and 474 are connected in a T arrangement. Extending from the common junction of these three resistors is a conductor 476 connecting with the contacts 3F1. From the foregoing it will be appreciated that the signal generated by the potentiometer 458 is opposed by a manually procured signal from the potentiometer 466, any unbalance or difference between these signals serving to produce an error signal to the amplifier 414 and an actuating signal or output signal from this amplifier 414, which actuating signal energizes the control winding of the A.C. servomotor 406. It is by virtue of the A.C. servomotor 406 that the head 222*b* is moved with respect to the record 156*b*** during either "record" or "playback" operation.

The dredge vibrator motor has already been denoted by the reference numeral 88 and for the purpose of controlling the speed of this motor there is employed a rotary type of controller 478 comprising a plurality of brush contacts 480, these brush contacts being wiped by a brush arm 482 driven by the gear train 404. In passing, it can be stated that the control of the motor 88 does not have to be at precisely any graduated rate and hence six speeds have been found to be entirely satisfactory, although any preferred number might be used. The brush arm 482 is connected by a conductor 484 to one source of power supply designated by the numeral 486, this being occasioned via contacts 4F2 located on the manual relay 4F. An alternative path of energization may take place from a source 488 through contacts 5F4 on the "record" relay 5F and still a further alternate path may take place from a source 490 via contacts 2F3 situated on the "playback" relay 2F.

To each of the contacts 480 is connected a relay 6F, 7F, 8F, 9F, 10F, or 11F, these relays serving the office of controlling contacts 6F1, 7F1, 8F1, 9F1, 10F1, or 11F1. By means of a transformer 492 having the aforenoted relay contacts 6F1, 7F1, 8F1, 9F1, 10F1, and 11F1 in circuit with the secondary thereof, it will be appreciated that a tapped relationship is established and that the selection of any particular tap will determine the speed at which the D.C. motor is to be operated. However, up to this point we have dealt only with an A.C. supply of power and since the motor has been designated as a D.C. motor, a rectifier 494 is connected in circuit between the various relay contacts and the motor 88. Still further, it is contemplated that the motor 88 be provided with a constant field excitation 496 via an auxiliary rectifier 498 connected in circuit with a portion of the secondary of the transformer 492.

From the foregoing it will be seen that the duties assigned to the records **156*a* and 156*b* have been to control the drum speed and the vibration rate of the dredge arm assembly 66. However, while the various other tasks to be performed by the system have been mentioned these particular tasks have not as yet been specifically assigned to the other records. Consequently at this time it is desired to point out, although this is entirely an arbitrary assignment, that the record 156*c* is utilized to control the up and down movement of the dredge arm assembly 66. The record 156d serves to govern the swing of the dredge arm. The record 156e is employed in the exemplified instance to control the back and forth movement of the carriage 50. The record 156f functions to control the tub tilt, and finally the record 156g has been assigned the task of controlling the rotation of the tub. As already mentioned rather briefly, the motions controlled by certain records involve the use of duplicated circuitry. More specifically it should be explained that the motions derived from the records 156c, 156d, 156e, 156f, and 156g** have associated therewith duplicate circuits G, this illustrative circuitry being depicted only once (Figure 14) owing to the need for drawing simplification.

*Duplicate circuitry for work performing motion control*

Describing now in detail circuit G shown in Figure 14, it might be stated at the outset that there are certain similarities and analogies between this circuit and the previously described circuits E and F. In this regard, the circuit G includes a solenoid 499 similar to the solenoid 252. Also, there is a gear train 500 corresponding in function to the earlier described gear train 270. Proceeding further, the present circuitry comprises a two phase A.C. servomotor 502 having a constant excitation winding supplied by constant source 408 via conductor 506. In circuit with these conductors 506 are relay contacts 2G1 and a capacitor 507. The function of the capacitor 507, as in the previous two instances, is to maintain an out of phase relationship between the constantly excited winding and the control winding of the servomotor 502. The signal for the control winding is delivered to the servomotor 502 over conductors 508 from an amplifier 510. It is this actuating signal from the amplifier 510 that is instrumental in controlling the speed and direction of the motor 502.

On the input side to the amplifier is a tachometer 512, which as previously stated in conjunction with circuits E and F, is for the purpose of stabilizing the system. Any error signal is fed from a vacuum tube 514. The tachometer is actually connected to the amplifier by means of conductors 516 and a conductor 518 serves to connect the vacuum tube 514 with relay contacts 2G2, these relay contacts being carried by a "playback" relay 2G. In passing, it might be mentioned that this relay also controls the previously mentioned contacts 2G1. From the contacts 2G2 the signal coming from the vacuum tube 514 continues in its course over a conductor 520 which leads directly to the amplifier 510. As in the case of the circuits E and F, the signal transmitted from the vacuum tube 514 is done so on the cathode follower principle.

In effecting the control signal a needle 522 is employed on the head 222c and this needle is connected directly to the grid of the vacuum tube 514 through double-throw contacts 1G1 on a relay 1G. It is this same relay 1G that when energized connects the needle 522 to a negative 20 volt D.C. source of writing voltage 524 over conductors 526 and through contacts 3G1 carried on a "record" relay 3G. Further contacts 3G3 on the relay 3G function in a manner to energize the relay 1G and the solenoid 499 via a conductor 527.

Since the purpose of the various servo systems, one of which is exemplified by the circuit G, now under consideration, is to control the several driving mechanisms 32, 42, 64, 122, and 144, it might be well at this stage of the description to explain briefly the equipment comprising these various driving mechanisms. In this regard, consideration is now given to the driving mechanism 122 although, of course, it can be (and is to be so considered) identical to the other enumerated driving mechanisms. Referring therefore temporarily to Figures 1 and 14, the driving mechanism 122 is used to govern the vertical movement of the dredge assembly 66 and includes a combination variable displacement oil pump and constant displacement oil motor 528. Conventionally these components of the combination labelled 528 include an A-end and a B-end. In order to operate the pump or A-end of the combination 528 a pump motor 530 is employed and by reason of reduction gearing 532 the oil motor or B-end of the combination 528 is connected to the shaft 120. In addition to the above enumerated components the driving mechanism 122 includes a synchro transmitter 534. The rotor of the synchro transmitter is excited by 115 volts A.C. from a source bearing the reference numeral 536 whereas the stator of this synchro transmitter is connected by a trio of conductors 538 with a synchro control transformer 540. The synchro control transformer 540 is not an integral part of the driving mechanism 122 but is an important adjunct thereto, for it is the output from this synchro control transformer 540 that is the error signal indicating any error existing between the head 222c and the load—the vertical movement of the dredge arm assembly 66 in the exemplified situation.

The error signal produced and transmitted from the control transformer 540 is fed by way of conductors 542 to an amplifier 544. The actuating signal or output from the amplifier 544 is delivered to the control winding of a servomotor 546. For the purpose of stabilizing this portion of the system a tachometer 548 is associated with the servomotor 546 being driven in unison therewith. Another accessory to this portion of the system is a potentiometer 552 serving to supply a dampening action to the servo system. By virtue of the servomotor 546 there is a control of the governing or control valve on the A-end of the combination variable displacement oil pump and constant displacement oil motor 528. While the combination variable displacement oil pump and constant displacement oil motor have not been presented in detail, having been indicated only in block form, nonetheless, there are several manufacturers producing such a combination, one of which manufacturers is the Oilgear Company of Milwaukee, Wisconsin.

Mechanically connectable to the gear train 500 is a D.C. motor 554. The motor 554 may be engaged or disengaged by reason of an electro-magnetic clutch designated by the numeral 556. While more will be said later on concerning the function of the D.C. motor 554, nonetheless, at this time it may be pointed out that this motor serves to drive the head 222c in a manner better than would be accomplished merely by resort to the A.C. servomotor 502.

Resembling the push button selector switch unit 310 and 438 is a selector switch unit indicated in its entirety by the numeral 558. This switch unit 558 includes an "off" button 560, a "jog" button 562, a "manual" button 564, a "record" button 566, and a "playback" button 568. These various buttons perform functions identical to those previously mentioned with the exception of the jog button 562. Perhaps the precise purpose of the jog button may best be reserved for discussion during the operational sequence, but at this time it might be brought out that the jog button 562 could be located quite near the apparatus and thus remote from the console D, if desired. In operation, the jog button would take away the control normally provided by the "manual" button 564 and would act in concert with a key type switch still to be mentioned to effect a rather precise movement with regard to the work performing motion under the supervision of this particular circuit. As already indicated, the circuit G and the description presented in detail therewith concerns the control of the dredge arm assembly 66 as far as its vertical motion is concerned. Hence the jog button 562 would be used as a preliminary to positioning the dredge arm assembly 66 into a preferred elevated position. In furtherance of the foregoing aim the jog button 562 when actuated moves contacts 570, 572, 574 and 576. A pair of conductors 578 extends between the contacts 570 and 572, these conductors connecting with the armature of the D.C. motor 554. When performing a "jog" operation a key type of reversing switch 580 (introduction to which has been made just above) is manipulated, this reversing switch being in a circuit with the contacts 574 and 576. The key type of reversing switch 580 is connected to a fixed source of D.C. voltage at 582 and this fixed source of voltage, of course, by way of the reversing switch 580 and the contacts 570, 572 feeds power to the armature of the D.C. motor 554. Also the motor receives D.C. field excitation from a source labelled 584.

In the circuit G there is employed a "manual" relay 4G for the purpose of energizing the electro-magnetic clutch 556 through contacts 4G1 which contacts are in circuit with a first voltage source 586 for the electro-magnetic clutch. The circuit connections take place by way of a conductor 588 and a ground connection. The manual relay 4G is, as already indicated, energized by a "manual" button 564, this button 564 actuating contacts 690 to close a circuit containing the manual relay 4G. Similarly, contacts 691 are actuated by the jog button 562 to also energize the manual relay 4G. The manual relay 4G carries contacts 3G2 in addition to the contacts 3G1. Further contacts 692 are actuated by the depressing of the record button 566 and closure of these contacts 692 function to energize the earlier mentioned record relay 3G. The contacts 3G2 are in serial relation with a source of voltage 694 and power supplied from this source to the electro-magnetic clutch 556 is over a conductor 696.

In addition to the contacts already mentioned as being operated by the playback relay 2G, this relay 2G has contacts 2G3, the purpose of which is to supply out of phase excitation to the record **156*c* from a "playback" excitation source in the form of a transformer 698, this taking place through the medium of the slip ring assembly 182 and the spring contacts 168 bearing directly against the metal areas 172*c* and 174*c*. In order to energize the playback relay 2G, the button 566 actuates contacts 699**.

A voltage source or supply 700 for both the record and playback relays 3G and 2G, respectively, is in the circuit with cam switch contact 702 forming a part of the cam switch 216. A conductor 705 connects the cam switch contact 702 directly with the relays 2G and 3G, as pictured in the circuit G.

Referring once again to the common relay 1C already mentioned in conjunction with Figures 12 and 13, it will be observed that this relay has been duplicated once again in the present Figure 14, so as to provide enough circuitry in one figure which will afford a complete operation. It might be reiterated at this point, however, that this relay is actually only a single relay but is duplicated for the sake of clarity in presenting the various circuits E, F, and G. However, there are contacts carried by the common relay 1C which are restricted in this situation to just the circuit G, these contacts being first of all contacts 1C1G corresponding in function to the contacts 1C1E. The contacts 1C1G are normally closed contacts in circuit with the cam switch contacts 702 and the voltage source 700. Secondly, the common relay 1C carries additional contacts 1C2G which are restricted also just to the circuit G now under discussion, these contacts corresponding to the contacts 1C2G in performance. These contacts 1C2G are normally open contacts and are for the purpose of energizing the manual relay 4G whenever the common relay is energized. In order to energize the common relay it will be recalled that a push button switch 332 is employed and by reason of hold contacts 1C3 on the common relay the circuit remains closed once the button associated with the switch 332 is depressed. Having already mentioned the "preset" switch 334 it will be recognized that this preset switch operates so as to de-energize the common relay 1C even though the hold contacts 1C3 are closed since this switch 334 is in serial relationship with contacts 1C3.

As already pointed out, the D.C. motor 554 gives a finer speed control than would be accomplished with just the A.C. motor 502 so this motor 554 has appreciable utility during the employment of either a "jog" or "manual" operation. Its armature excitation is derived from a rectifier 706 by way of reversing double-throw contacts 5G1 or 6G1. These contacts 5G1 and 6G1 are actuated, respectively, by means of relays 5G and 6G. Thus when the contacts 5G1 are closed the motor 554 rotates in one direction and when the contacts 6G1 are closed the motor will rotate in a opposite direction.

The way in which the relays 5G and 6G are selectively energized is by means of a brush arm 708. By moving the brush arm 708 into engagement with either a commutator plate 710 or a commutator plate 712 an electrical path is established from a transformer 714, the secondary of which is connected to both the relays 5G and 6G. This same transformer 714 also supplies power to a group of speed control relays 7G, 8G, 9G, 10G, and 11G. These speed control relays are electrically connected to a series of brush contacts or commutator segments 716 engageable by the brush arm means 708. Inasmuch as the group of speed control relays operate respective contacts 7G1, 8G1, 9G1, 10G1, and 11G1 in circuit with the tapped secondary of the transformer 714, various magnitudes of A.C. voltage can be applied to the rectifier 706, this taking place via conductors 718.

Before describing the console D in detail it might be well to review once again the various motions achieved from the records that are circumscribed about the drum 150, eliminating for the moment the records **156*a* and 156*b* since these records do not depend upon the circuitry pictured in Figure 14. First, it will be recalled that the record 156*c* is used to control the up and down or hoist and lower motions of the dredge arm assembly 66. As for the other remaining movements controlled by duplicate circuitry corresponding to that designated by the letter G, the record 156*d* governs the dredge arm swing, the record 156*e* controls the horizontal carriage movement, the record 156*f* the tub tilt movement, and the record 156*g* the tub rotation. Also, as already explained these movements are obtained by resort to various driving mechanisms and these driving mechanisms will be re-enumerated in the same order that the records above described have been listed. Hence, the driving mechanism 122 functions in conjunction with the head 222*c* to move the dredge arm assembly 66 up and down; the driving mechanism 148 together with the head 222*d* operates to effect a swinging action of the dredge assembly 66; the driving mechanism 64 with the head 222*e* controls the horizontal motion of the carriage 50; the driving mechanism 32 together with the head 222*f* governs the amount of tub tilt, and finally the driving mechanism 42 controlled by the head 222*g* serves to position the tub rotatably. Although operated in a somewhat different fashion than are the five motions above reviewed, nonetheless the drum speed control is desirably effected from the console D also and to this end a knob 724 may be employed which is mechanically connected with the brush arm 348 of the potentiometer 344. Reference should be made to Figure 12 for the schematic representation of this potentiometer 466 and its associated knob 724**.

*Control console*

Considering the console D and its relationship with the five motions derivable with the circuitry designated by the letter G, sufficient description of this console D is advisable in order to provide clear comprehension as to just how these various work performing movements may be achieved. From Figure 1 it will be observed that two hand operated control assemblies 726 and 728 are employed. The left hand control assembly 726 may be given the task of controlling both the tub tilt and tub rotate position. By swinging the handle of this assembly in a vertical plane the tub tilt movement may be realized and similarly by swinging the handle in a horizontal plane the tub rotate movements may be realized. With respect to the right hand control assembly 728, this assembly has assigned to it the duty of controlling the dredge arm assembly hoist and lower movement, these movements being achieved by swinging the handle of the control assembly 728 in the same direction as the handle 726 is moved in order to derive tub tilt movement. Similarly, the dredge swing movement may be gotten by swinging the handle in a horizontal plane just as is done in conjunction with the realization of the tub rotate movement. The horizontal carriage movement may be achieved by a wrist movement, that is, turning the handle in either a clockwise or counterclockwise direction. Still further, in order to control the rate of vibration of the dredge arm assembly 66, a trigger action may be incorporated into the control assembly which trigger action will subsequently be explained in more detail, this completing the list of motions that are desired.

Figure 10:
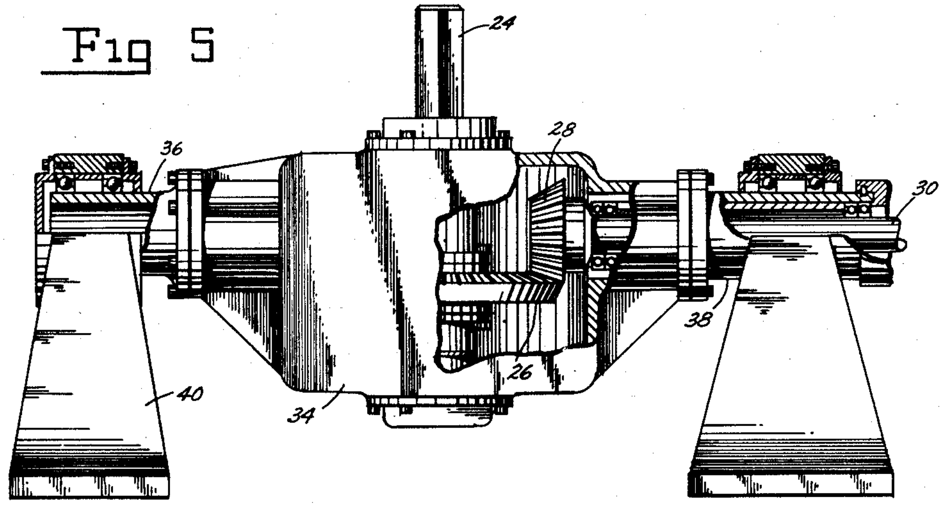
Figure 10 is a view of the hand control mechanism forming a part of the console depicted in Figure 1.
Figure 11:
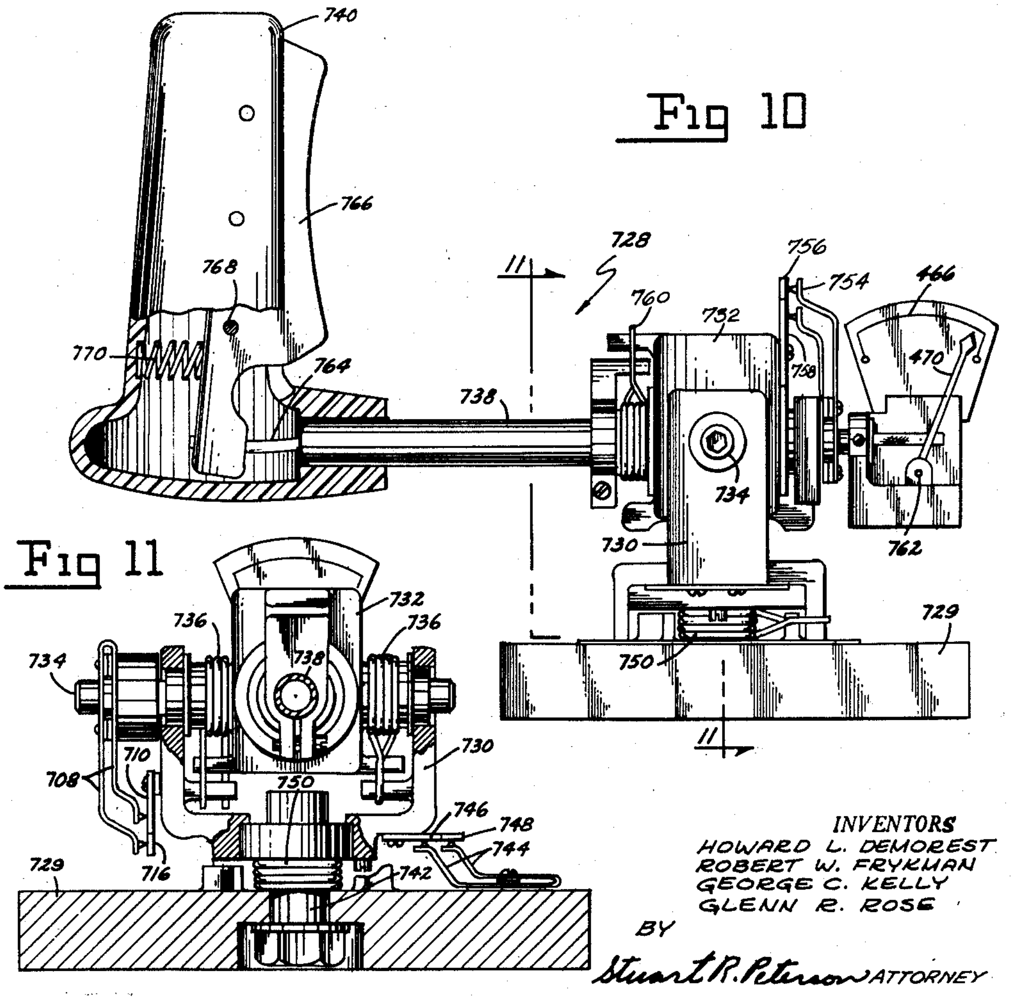
Figure 11 is a sectional view taken in the direction of line 11—11 of Figure 10.

Referring now to Figures 10 and 11 where the right hand control assembly 728 is pictured, it will be seen that this assembly is provided with a base plate 729. Surmounting the base plate is a yoke 730 and a yoke pivot 732, the yoke pivot 732 being rendered pivotal relative to the yoke 730 by reason of a transverse pivot pin 734. It will be recalled that in Figure 14 the brush arm 708 was schematically presented and in Figure 11 this brush arm, which is actually a double brush arm and hence, more strictly speaking, a brush arm means, is fixed to the yoke pivot 732 so as to be rotated in unison therewith. As an aid to further orientation of the mechanical details it is to be noted that Figure 11 also shows structurally the commutator segments 710 and 716 already referred to in conjunction with Figure 14. A pair of torsion springs 736 serve as the agency by which the yoke pivot 732 is centered relative to the yoke 730. Continuing with the description of the hand operated control assembly 728, this assembly additionally includes a handle tube 738 having at its far end a handle grip 740. The structure thus far described permits the operator to move the control assembly in a vertical plane which movement, of course, produces the up and down movement of the dredge arm assembly 66.

To get the dredge swing, a vertical pin 742 about which the yoke 730 rotates is employed. Brush means 744 is utilized corresponding to the previously alluded to brush means 708. Further, commutator segments 746 corresponding to the segments 710 and commutator segments 748 corresponding in function to the commutator segments 716 are incorporated into the control assembly 728. However, these commutator segments, as well as the brush means 744, do not appear specifically in any schematic diagram inasmuch as it is contemplated, as hereinbefore stated, that the circuit G will be duplicated so as to achieve the additional motions more specifically described hereinbefore. Consequently it would be in the duplicated circuitry that these commutator segments and the additional brush means would appear schematically. Encircling the vertical pin 742 is a torsion spring means 750, this particular torsion spring means functioning to center the yoke 730 about its vertical axis.

Having already stated that the carriage travel is to be derived by a wrist motion of the control assembly 728, to achieve this wrist motion the handle tube 738 is journaled for rotation in the yoke pivot 732. Also cooperating with the production of the carriage travel is a brush means 754 fixed to the end of the tube 738. This brush means 754 is in wiping relationship with commutator segments 756 and 758. Here again these commutator segments and the brush means are not pictured schematically inasmuch as the drawing G is to be duplicated in practice with these accessories incorporated therein. Further, in the achievement of the carriage travel is torsion spring means 760 functioning to position the tube 738 so that it normally rests in a neutral position.

As already mentioned when presenting the description pertaining to Figure 13, that is, the circuitry designated by the letter F, the brush arm 470 of a potentiometer 466 was mentioned and this brush arm is pivoted mechanically at 762 as illustrated in Figure 10. Movement of the brush arm 470 is effectuated by a flexible cable 764 extending through the tube 738. The opposite end of this flexible cable, however, is attached to the lower end of a trigger element 766, the trigger element being rendered pivotal by a pin 768 extending transversely through the insulated handle grip 740. By reason of a coil spring 770 the brush arm of the potentiometer 466 is urged into a rest position which is a position adjacent the ground end of the potentiometer as indicated in Figure 13.

*Operation*

Having in mind the construction and arrangement of the principal elements thereof, it is believed that a complete understanding of the invention may now be had from a description of the operation. The versatility of the composite machine will first be presented by describing a so-called "practice" run, it being assumed that the operator, especially if he is not intimately familiar with the equipment, will wish to practice with the apparatus before actually making a recording. To inaugurate a practice run the operator will push the manual button 442 forming a part of the selector switch unit 438, and he will also depress the various manual buttons 564 of the switch units 558 (only one depicted). It will be recalled that there will be a total of five manual buttons 564 inasmuch as the circuit G will be duplicated five-fold. While a manual button 314 forming a part of the selector switch unit 310 is available, nonetheless it is not necessary to depress this button as the drum speed control circuit E need not be brought into play since the drum 150 can remain stationary throughout the practice run. Even if the manual button 314 is actuated by the operator, nothing will happen to the drum because the automatic start switch 372 must be closed in order to energize the start relay 6E. Energization of the relay 6E is necessary in order to close the contacts 6E3 in order to supply constant field excitation to the A.C. servomotor 204. Thus it will be seen that it is optional as to whether the manual button 314 is utilized at this time.

Referring to the dredge vibrate control circuit F, the actuation of the manual button 442 closed the contacts 446 thereby energizing the manual relay 4F. Energization of the relay 4F closes contacts 4F1, 4F2 and 4F3. The contacts 4F1 in turn energize the relay 3F throwing its contacts 3F1 to their lower position as seen in Figure 13. This lower position of the contacts 3F1 establishes a connection with the conductor 476 and the amplifier 414. The rotary potentiometer 458 is driven in accordance with the position of the head 222*b* and any unbalance between this potentiometer and the potentiometer 466 will appear as an error signal which is fed to the amplifier 414. The error signal, of course, is susceptible of being varied by merely moving the brush arm 470 through the medium of the trigger 766 on the control assembly 728 (Figure 10). It is to be noted that the vacuum tube 402 at this time is disconnected from the circuit F because of the position of the contacts 3F1.

The relay 4F as mentioned above closed the contacts 4F2 and it is the closing of the contacts 4F2 that is responsible for supplying energy to the rotary controller 482. Depending upon the particular contact 480 of this controller that the brush arm 482 engages, one of the relays 6F, 7F, 8F, 9F, 10F, or 11F will be energized. These relays control contacts 6F1, 7F1, 8F1, 9F1, 10F1, or 11F1 and hence the particular contact 480 of the controller 478 is responsible for applying a particular voltage to the rectifier 494 and the rectifier 494 in turn supplies a proportional D.C. voltage to the dredge vibrate motor 88. Owing to the fact that the motor 88 carries on its shaft 86 (Figure 4) the cam 84, the rate at which the motor operates determines the frequency with which the cam strikes the tappet 82 and hence the reciprocal movement of the inner tube 76. It will be recalled from Figure 4 that the reciprocal movement of the inner tube 76 moves the screen 70 back and forth and the rate of screen movement influences the amount of enameling frit that is permitted to fall gravitationally onto the tub 20 (see Figure 1 in this latter regard). From this portion of the operational description it is made clear, it is believed, that the operator can get the "feel" of the amount of enameling frit that will be scattered onto the tub 20 from the retainer 68.

Still continuing with the so-called practice run, the operator will naturally wish to experiment with the vertical movements possible with regard to the dredge arm assembly 66. Therefore, the actuation of the "manual" button 564 of circuit G energizes the "manual" relay 4G of Figure 14, thus closing contacts 4G1 in circuit with the electro-magnetic clutch 556. Closure of these contacts 4G1 thus furnishes electric power from the source 586 which is delivered to the clutch over the route provided by the conductor 588 and the ground connection associated with the clutch.

The arrangement so contrived conditions the D.C. motor 554 for subsequent operation due to the position of the contacts 570 and 572 on the jog switch 562. However, inasmuch as the contacts 5G1 and the contacts 6G1 at this moment are not closed the motor 554 does not as yet rotate. However, when the brush arm means 708 of the hand operated control assembly 728 is moved so as to wipe either the commutator segments 710 or 712, then either the relay 5G or 6G is energized depending upon whether an "up" or "down" movement of the dredge arm assembly 66 is desired. Reference should be made again to Figures 10 and 11 for a complete understanding of this particular phase of the operation. We will assume for the sake of discussion that the energization of the relay 5G produces an up movement and once having established the direction of movement then further rotation of the brush means 708 in the same rotative direction will bring it into contact with any one of the contacts 716. Since these contacts 716 are in circuit with the various relays 7G, 8G, 9G, 10G, and 11G, the particular relay associated with the contact 716 selected will determine the rate at which the dredge arm assembly 66 moves upwardly. This is by virtue of the fact that the contacts 7G1, 8G1, 9G1, 10G1, and 11G1 are connected electrically to the tapped secondary of the transformer 714 and the particular contacts closed will govern the magnitude of A.C. voltage furnished to the rectifier 706 and hence the value of D.C. voltage applied to the armature of the motor 554.

The operation of the D.C. motor 554 in a particular direction will drive the gear train 500 so as to position the synchro control transformer 540 in accordance with the particular position of the head 222c at any given moment. Any disagreement between the synchro control transformer 540, which is the command synchro, and the synchro transmitter 534, which is the slave synchro, produces an error signal which is fed to the amplifier 544. This error signal is amplified so as to produce an actuating signal for the combination variable displacement oil pump and constant displacement oil motor designated in its entirety by the reference numeral 528. In this particular instance this combination 528 is a part of the drive mechanism 122. The drive mechanism 122 in this manner moves the dredge arm assembly 66 to the desired elevation.

Mechanically speaking, the movement referred to in the paragraph above takes place by way of the shaft 120, the bevel gear 118 directly associated therewith, and the bevel gear 116 meshed with the gear 118. The drive continues over a route including the shaft 114, the bevel gear 112, the ring bevel gear 110, the bevel gear 108 in mesh with the ring gear 110, the short shaft 106, the bevel gear 104, the bevel gear 102, to the shaft 100. The shaft 100 carries the pinion 98 which is engaged with the rack 96 on the column 92 and in this situation the rack is moved upwardly to the desired position already mentioned. Owing to the reduction gearing 532 it will be appreciated that the synchro transmitter 534 of the driving mechanism 122 is moved in synchronism with the dredge arm assembly 66 and hence this synchro transmitter 534 reflects directly in an electrical manner the position assumed by the dredge arm assembly 66.

By and large, the manual control above presented will be entirely adequate in producing the enameling operation. However, in some instances a slower control will be found desirable and to this end the "jog" button 562 may be depressed in lieu of depressing the manual button 564. Inasmuch as the selector switch unit 558 is designed so that the various buttons comprising it are mechanically interlocked so that only one is effective at any given time, the actuation of the jog button 562 will automatically destroy the control exercised by the manual button 564. Assuming that a "jog" or "inching" operation is desired, then as hereinbefore pointed out, the jog button 562 is depressed and this makes available the subsequent realization of one rather slow speed by reason of the fixed jog D.C. voltage source 582. Determining the particular direction that the jogging action will take place in, the key type reversing switch 580 gives "fingertip" control of the motor 554 in either direction. As is customary with D.C. motors in general, a rather fine degree of speed control is possible and this is the salient reason for adding to the circuitry diagrammed in Figure 14 the motor 554, for otherwise the A.C. servomotor 502 might be called upon to perform both the "manual" and "jogging" functions. In brief then, the moving of the dredge arm assembly 66 vertically may be accomplished by actuating the hand control assembly 728 or the jog button together with the key switch 580.

In achieving the vertical movement of the dredge arm assembly 66 by the "manual" operation the handle grip 740 of the control assembly 728 is moved or oscillated through a vertical path to a desired position, making an angle residing either above or below the horizontal. Simultaneously with this vertical movement of the control assembly 728 there can also be a side to side movement in order to produce a swinging action of the dredge arm assembly 66, and of course the carriage 50 at the same time may be moved horizontally along its tracks to thereby position the dredge arm assembly 66 longitudinally with respect to the tub 20 by the simple expedient of rotating the handle grip 740 on the control assembly 728 in either a clockwise or counter clockwise direction. All of these handle grip movements may be performed concurrently, and still further, at the same time the trigger 766 may be actuated to obtain the desired rate of dredge arm vibration. By means of the other control assembly 726 the tub may be both tilted and rotated since this control assembly is operated by the operator's left hand. Thus it is believed manifest that all of the needed movements that might be expected of the dredge arm 66 and the spider 22 holding the tub 20 may be effectuated with both of the attendant's hands. In this way the surface of the tub 20 may be completely covered with enameling frit leaving no segments or areas that would require a "hand" application. While more will be said later on when the automatic playback operation is undertaken it might be mentioned that the knob 724, controlling the speed of the drum 150, will be located within ready reach of the attendant inasmuch as it is located on the console D near the control assemblies 726 and 728. In any event it will be appreciated that the operator or attendant may stand at a remote station and view his efforts, even when practicing, in comparative comfort. In this latter regard, it will be realized that the tub 20 is at an elevated temperature so as to fuse the enameling frit as it is spread thereover.

Having practiced for a sufficient length of time in order to gain both familiarity and proficiency, it is now to be assumed that the operator will wish to make a recording so that the equipment may be used subsequently for repeated playback or automatic operation. To this end, the operator will first wish to position the drum 150 into a preferred rotated starting position and to do so he depresses the button 380 in circuit E which energizes the phase one relay 7E. Energization of the relay 7E, of course, operates its contacts and among these contacts are included the contacts 7E2. Closure of contacts 7E2 is instrumental in operating the rapid reset motor 208 in a direction so as to rotate the drum 150 rather rapidly and since the cam 212 moves in unison with the drum 150 this cam 212 will be rotated until its phase one notch comes into juxtaposition with the cam switch 218. At this time, contacts 388 on the cam switch 218 will open and opening of these contacts will cause immediate de-energization of the relay 7E, with the consequent dropping out of the contacts 7E2. Hence, it will be obvious that the rapid reset motor 208 is stopped at a particular position which will be suitable as far as the drum 150 is concerned for initiating a recording operation. The meter 396 is readily discernible and the operator is at liberty to check visually from his remote vantage point the position that the cam 212 has stopped the drum 150 in by noting the position of the needle on the meter 396.

Although all of the records **156*a*, 156*b*, 156*c*, 156*d*, 156*e*, 156*f*, and 156*g* will be utilized simultaneously in recording the movements necessary to enamel the tub 20, nonetheless, for the present moment we will be concerned solely with the record 156*a* and its particular function which as already hereinbefore stated concerns the control of the drum speed. Thus, in making a record, the "record" button 316 is depressed which closes the contacts 322 in circuit with the "record" relay 5E. Energization of the relay 5E, of course, actuates all of its associated contacts. First it is to be observed that the contacts 5E1, normally open, are closed so as to energize the relay 3E. With the relay 3E energized there is conditioned into the circuitry bearing the letter E the resistors 342, 350, and 352 inasmuch as the contacts 3E1 carried by the relay 3E are moved to their lower position and are thereby connected to the conductor 354. The conductor 292 in turn leads directly to the amplifier 284. Further, energization of the record relay moves the contacts 5E2 from their grounded position to a position engaged or connected to the electrical source 306. Simultaneously with the movement of the contacts 5E2 is movement of the contacts 5E3. The latter contacts 5E3 serve to energize the relay 1E and at the same time energize the solenoid 252. The relay 1E, when energized, controls its contacts 1E1 moving them into a lower position so as to complete the circuit from the writing source of voltage 306 to the needle 228. Concurrently with this happening, the energization of the solenoid 252 retracts its armature 254 so as to compress the spring 256 thereby leaving the spring 250 which is responsible for rotating or pivoting the yoke 238 and the needle assembly 226 in a counterclockwise direction as viewed in Figure 8 so as to bring the needle 228 into engagement with the record 156*a*. The circuit involving the needle 228 and the record 156*a* is completed to ground by reason of the brush contacts 168 bearing on opposite sides of this record 156*a*. A still further condition obtaining by virtue of the energization of the record relay 5E is the movement of the contacts 5E4 from their grounded position to their closed position with respect to the conductors 278, this movement supplying constant field excitation to the A.C. servomotor 272. However, the servomotor 272 does not rotate until an actuating signal has been impressed on its out of phase winding, it being remembered that the condenser 279 is utilized so as to provide what is substantially a 90° phase relationship between the constant voltage winding of the servomotor 272 and its control winding which receives an actuating signal from the amplifier 284 via the conductors 282**.

At this stage, the operator will wish to place the drum 150 in rotation and to do this, using the A.C. servomotor 204 as the driving means, he depresses the automatic start button 372. This energizes the start relay 6E and closes the contacts 6E3 leading to the constant voltage winding of the servomotor 204. With the drum 150 rotating he, of course, is enabled to record, and in this portion of the operation we are concerned directly with the recording of various drum speeds. Usually the operator will record only at a given speed and this speed can, if desired, be varied during a "playback" operation by adjusting the value of the resistor 359, usually being speeded up. Nonetheless, the operator, through the medium of the circuitry labelled E, is empowered with the privilege of varying the drum speed to any selected value during the recording operation. Accordingly, once having placed the drum 150 in motion, the potentiometer 344 is manually actuated by the knob 724 creating an unbalanced voltage condition with respect to the resistor 350 in circuit with this potentiometer and the resisor 342 which receives its signal from the rotary potentiometer 336. This error signal is delivered to the amplifier 284 over the conductor 292, it being remembered that the contacts 3E1 have been moved into engagement with the conductor 354. Consequently, the actuating signal produced by the amplifier 284 is fed to the control winding of the A.C. servomotor 272 and functions to drive the gear train 270, movement of the gear train 270, of course, resulting in movement of the head **222*a* with respect to the record 156*a*. Since the needle 228 is at this time bearing against the metallized surface of the record 156*a*, the heat from the electrical current passing therethrough will burn or vaporize a portion of this metallized surface so as to produce a trace 170*a* which is insulating in character but flanked by the metallized areas 172*a* and 174*a***.

Simultaneously with the motion of the gear train 270, the rotary potentiometer 356 is being moved so that its brush arm 360 delivers a signal to the amplifier 366 corresponding electrically to the physical position of the head **222*a*. As long as there is any disagreement between the signals put out by the potentiometer 356 and the tachometer 362 there will be a resulting change in the rate of rotation of the drum 150 inasmuch as the amplifier 366 receives these two signals and produces an actuating signal via the conductors 368 which is fed to the control winding of the A.C. servomotor 204. Since the amplifier 366 is sensitive to both phase difference as well as the magnitude of such difference, the actuating signal impressed upon the control winding of the motor 204 is of such character as to determine both the direction of rotation of the drum 150 and its speed. From the foregoing it will be appreciated that the "record" operation is quite similar to the "manual" operation, differing largely because of the fact that the needle 228 is in contact with the record 156*a* and is producing the trace 170, which trace is, of course, dependent upon, and therefore a derivative of, the speed that the drum 150** is driven.

*Dredge arm*

Under the supervisory control of the operator is, of course, the dredge arm vibration frequency and inasmuch as the operator will undoubtedly wish to vary, or at least be able to vary, the frequency of the vibration of the dredge arm assembly 66, the circuit F of Figure 13 which will now be considered permits this to be accomplished. Accordingly, the operator, when he depresses the "record" button 316 of circuit E, will also actuate the "record" button 444 of the circuit F now under discussion. Depression of the record button 444 closes the contacts 448, thereby energizing the "record" relay 5F. A group of contacts controlled by the relay 5F is immediately operated. In this regard, the contacts 5F1 close to energize the relay 3F, and the energization of the relay 3F in turn moves its contacts 3F1 from its upper or normal position to the lower position which establishes contact with the conductor 476. Consequently, it will become manifest that the junction of the resistors 464, 472, and 474 is brought into electrical communication via the conductor 422 with the amplifier 414. Simultaneously the contacts 5F2 function to condition the circuit for the utilization of the negative 20 volt D.C. writing voltage from the source 432. However, as will presently be made clear, the circuit is not as yet completed to the needle 430 as far as the description is concerned. Since the relay 5F carries contacts 5F3 which are closed along with the contacts 5F1 and 5F2, it will be recognized that the relay 1F and the solenoid 400 are both energized by way of these contacts. It is the energization of the relay 1F that is responsible for the movement of the contacts 1F1 from their upper or normal position to their lower position and it is these particular contacts that complete the circuit from the writing voltage source 432 to the needle 430. The solenoid 400, when energized, serves to permit the needle 430 to come into contact with the record 156*b* by spring action, all in a manner as did the solenoid 252 of the circuit E. Consequently, a detailed explanation as to how this action is achieved need not be repeated at this time. Furthermore, the contacts 5F4 also mounted on the relay 5F are closed so as to supply energizing power to the rotary controller 478 via conductors 484. A fifth set of contacts, 5F5, furnish excitation to the constant voltage winding of the A.C. servomotor 406, this taking place from the source 408.

Since it is the relative position of the head 222*b* with respect to the record 156*b* that will dictate the frequency or rate of vibration of the dredge arm assembly 66, it is the variance between the voltage supplied to the resistor 472 from the potentiometer 466 that is adjusted in order to create an unbalanced condition with respect to a voltage prevailing across the resistor 464. At this point, attention should be directed once again to Figure 10 where it will be discerned that the trigger 766 mounted on the control assembly 728 is responsible for moving a cable 264 in a manner so as to position the brush arm 470 with respect to the resistance of the potentiometer 466.

Any difference established between the resistors 464 and 472 by reason of moving the brush arm 470 by the trigger 766 will be delivered to the amplifier 14 and, besides detected as to phase, amplified so as to appear as an actuating signal to be impressed upon the control winding of the A.C. servomotor 406 by way of conductors 412. The motor 406 will then, of course, drive the gear train 404 and the head 222*b*, together with its needle 430, in such a direction so as to null or neutralize any voltage unbalance. This null positioning is effected by reason of the rotary potentiometer 458 driven in unison from the gear train 404, because it supplies a voltage indicative of the head's physical position as said head is moved to its null position.

Also driven in unison from the gear train 404 is the rotary controller 478. Inasmuch as it has six contacts 480, in addition to its "rest" or "off" one, which can be wiped by the rotary arm 482 of this controller it will be appreciated that the speed control relays 6F, 7F, 8F, 9F, 10F, and 11F may be selectively energized so as to operate their respective contacts 6F1, 7F1, 8F1, 9F1, 10F1, or 11F1, depending upon which speed control relay is energized. Closure of any of these speed control relay contacts will impress an A.C. voltage of a particular magnitude derived from the transformer 492 on the rectifier 494 and the output from the rectifier is sent to the armature of the dredge vibrate motor 88. The motor 88, just as in the previously described "manual" operation, rotates the cam shaft 86 and by reason of the cam 84 engaging the tappet 82 the inner tube 76 is reciprocated back and forth in a manner to oscillate or rapidly shift the screen ring 72 and its screen 70 with respect to the retainer 68, thereby depositing or scattering a preferred amount of enameling frit, which action is dependent upon the degree of rotation or movement of the brush arm 470 of the potentiometer 466. All the while this is happening, it will be appreciated that the needle 430, being in contact with the record 156*b*, will be burning the trace 170*b* and as was the case with the record 156*a* and its trace 170*a*, the trace 170*b* will be substantially insulating in character as far as its electrical attributes are concerned to provide the separated metallized areas 172*b* and 174*b*.

Describing now the manner in which the circuitry G associated with the remaining records 156*c*, 156*d*, 156*e*, 156*f*, and 156*g* is utilized during a "recording" operation, attention should now be directed to Figure 14. As in the other situations, the record button 566 is depressed in order to close the contacts 692 and thereby energize the relay 3G. Energization of the relay 3G closes the contacts 3G1, conditioning the circuit leading to the needle 522 for the writing operation, such writing operation taking place by way of the source of negative voltage designated by the numeral 524. Concurrently with the closing of the contacts 3G1, the contacts 3G2 which are in circuit with the electro-magnetic clutch 556 are likewise actuated. Still further, the contacts 3G3, upon closing, supply energizing power to both the relay 1G and the solenoid 499. Relay 1G, upon being energized, moves the contacts 1G1 carried by it from their upper position to their lower position thus completing the connection of the source 524 to the needle 522. As already mentioned, closure of the contacts 3G3 energize the solenoid 499 and as in the two previous situations the energization of the solenoid 499 is responsible for having the needle 522 engage the metallized surface of the record 156*c*. Here again the brush contacs 168 function to conduct the current from the record 156*c* to ground inasmuch as contacts 2G3 are normally in a position connecting with ground.

As will be recalled from an earlier portion of the discussion, the D.C. motor 554 is employed in lieu of the A.C. servomotor 502 in driving the gear train 500 to position properly the head 222*c* during a recording sequence. As yet, though, the motor 554 is not energized even though its clutch 556 becomes engaged through the energization of the relay 3G. To energize and operate the the D.C. motor 554 the handle grip 740 of Figure 10 is moved vertically and by so doing the brush arm means 708 is moved in a direction so as to bring it into engagement, say, with the commutator segment 710, assuming for the sake of discussion that the dredge arm 66 is to be moved in an upward direction. This movement of the brush means 708 is responsible for energizing the relay 5G with the concomitant result that its contacts 5G1 are moved in a direction so as to supply D.C. power from the rectifier 706 in such a direction as to rotate the D.C. motor 554 to a position which corresponds to the selected up position. As was the situation with respect to the "manual" operation, the contacts 716, depending upon which one is engaged by the brush arm means 708, is instrumental in energizing one of the speed control relays 7G, 8G, 9G, 10G, or 11G. Consequently, an appropriate A.C. voltage is impressed upon the rectifier 706 which is in accordance with the particular tap that the contacts 7G1, 8G1, 9G1, 10G1, 11G1 establish with the secondary of the transformer 714.

From the above, it will be recognized that the motor 554 will proceed to operate at a speed called for by the manual movement of the hand grip 740, inasmuch as the degree of movement of this hand grip is responsible for moving the brush arm means 708, and as already mentioned, the extent of this movement will govern the selection of a particular brush contact 716. Having placed in motion the gear train 500, it will, of course, be appreciated that the head 222*c* moves in unison therewith. Also moving in unison with the gear train 500 is the synchro control transformer 540. Owing to the continued movement of the rotor of this control transformer 540, there is produced an error or disagreement between the synchro transmitter 534 directly associated with the driving mechanism 122. Thus, if the dredge arm assembly 66 is not at the proper elevation as called for by the movement of the handle grip 740, the error signal thus developed between the synchros 534 and 540 will be transmitted to the amplifier 544 by way of the conductors 542. The amplifier 544, sensitive to both the phase differences and differences in magnitude, will emit an actuating signal which is fed to the servomotor 546. The servomotor 546 in turn positions the control valve on the variable displacement oil pump forming a part of the combination 528. Stated somewhat differently, the servomotor 546, being operated by the actuating signal developed by the amplifier 544, acts upon the A-end of the combination 528 and the amount of fluid fed to the B-end of the combination is thus controlled by influencing the amount of fluid that is pumped by the A-end.

In any event, the driving mechanism 122 as controlled by the servomotor 546 raises the dredge arm assembly 66. This takes place mechanically in an identical manner with the mechanical functioning which occurs during a "manual" operation. Hence, it is believed unnecessary to repeat in detail the mechanical movements transpiring as a result of the preceding servomotor operation. At this time, it is believed adequate to call attention merely to the transmission of such force by way of the gearing exemplified in Figure 2.

Of course, all the time that the dredge assembly arm 66 is moving upwardly, the needle 522 due to the movement of the head 222*c* is moving transversely with respect to the record 156*c*, leaving a trace similar to the previous alluded to traces 170*a* and 170*b*, the trace here being designated by the numeral 170*c*.

Once again it might be emphasized that the circuit G is duplicated in making and playing back from the records 156*d*, 156*e*, 156*f*, and 156*g* in addition to the record 156*c*. Further, since the particular directions in which the hand control assemblies 726 and 728 are moved in order to achieve "manual" operation have already been arbitrarily established, it is believed unnecessary to proceed to describe these various movements again at this time. However, there is one feature falling within the purview of the instant invention which should be stressed and while it does play an important role with respect to a "playback" operation, nonetheless it is rather timely at this point to mention the existence of the common relay 1C. If, during a recording operation, it should be found necessary or expedient to switch back to a "manual" operation by pressing the switch 332, this common relay 1C will immediately be energized. Not only does it pick up its own holding contacts 1C3 but this relay, as for as circuit E is concerned, breaks or opens the contacts 1C1E while simultaneously closing the contacts 1C2E. Opening of the contacts 1C1E causes deenergization of the record relay 5E but closure of the contacts 1C2E result in the energization of the manual relay 4E. As with the circuit E, a similar operation takes place concerning circuit F, for energization of the common relay 1C opens contacts 1C1F while closing contacts 1C2F. In this way, the manual relay 4F of this diagram F is immediately energized. By the same token, circuit G has the contacts 1C1G belonging to the common relay 1C opened and the contacts 1C2G concomitantly closed thereby transferring the operation from a "record" one to a "manual" operation.

Figure 4:
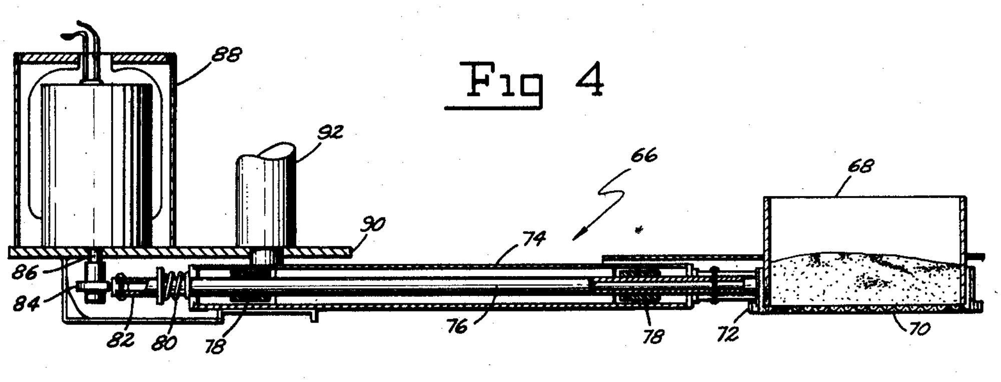
Figure 4 is a sectional view of the dredge arm assembly, this view being taken in the direction of line 4—4 of Figure 1.

Having energized the common relay 1C, then the operator proceeds to go through the operating motions previously listed in conjunction with the "manual" portion of the description. The need for any such transfer action will depend upon a variety of circumstances, one of which might be the necessity for replenishing the supply of enameling frit in the retainer 68 (Figure 4). Should such a set of circumstances develop, then the manual control would permit any "touching up" that might be needed, and when the same operating position has been reached, then the circuitry may be switched back over to a "record" operation merely by pressing the switch 334. Because the various solenoids 252, there actually being one for each head 222, are deenergized when the common relay becomes energized, then each of the recording heads 222*a*, 222*b*, 222*c*, 222*d*, 222*e*, 222*f*, and 222*g* will be retracted by spring action so as to withdraw their respective needles from the various records 156*a*, 156*b*, 156*c*, 156*d*, 156*e*, 156*f*, and 156*g* so that the needles are no longer engaging these particular records, avoiding any trace producing action.

Hereinbefore, phase one and phase two operation have been referred to. Thus, during a recording operation such as that that has just been described, the rotation of the cam 214 will eventually bring its notch into juxtaposition with the cam switch 220 and accordingly, the contacts 378, forming a part of this cam switch 220, will be opened as can be understood from an inspection of Figure 12. The opening of these contacts will, of course, deenergize the relay 6E inasmuch as the automatic start button 372 need only be depressed until the cam 212 has rotated sufficiently to bring its notch out of registry with the switch 218. Of course, it is not mandatory that the phase two operation be employed and where there has been found to be no need for such operation then the cam 214 would be either removed from the drum shaft or rotated thereon so that its notch is in alignment with the notch on the cam 212, thereby causing both the switches 218 and 220 to be operated in synchronism and not in a staggered relationship as herein described. However, wherever, for instance, the tub is to be enameled by making two "passes," phase one operation might embrace the first pass, say, and phase two the second as hereinbefore suggested.

From the foregoing description, it is believed that enough explanation has been given now so as to permit a person familiar with this art to perform the various recording operations. However, at this point it will be exceedingly helpful if a sequence of "playback" operation is detailed. Considering first the circuit E of Figure 12, the "playback" push button 318 of this circuit is depressed and thus closes contacts 324 to energize the "playback" relay 2E. Inasmuch as the playback relay 2E operates contacts 2E1 which are in circuit with the A.C. servomotor 272, closure of these contacts excites the constant voltage winding of this particular motor. It might be explained at this time that the contacts 2E1 are actually in parallel with the contacts 4E2 and 5E4 of the "manual" and "record" relays, respectively. Thus the energization of any of the relays 2E, 4E or 5E will apply constant field excitation to the A.C. servomotor 272. In addition to the contacts 2E1, contacts 2E2 are carried by the relay 2E and these contacts, upon closing, connect a source of excitation potential to the record 156*a* by way of the contacts 168 bearing thereagainst, this source of potential coming from a transformer 326. With regard to this source of excitation, it should be noted that the mid portion of the secondary of this transformer is grounded and that the excitation voltage applied to the record 156*a* consists of two components, being in a 180° out-of-phase relationship with each other. Consequently, the metallized area 172*a* is subjected to an alternating current field which is 180° out-of-phase with respect to the field to which the metallized area 174*a* is subjected. Thus the trace 170*a*, being of insulating character due to the fact that metal along this path has been burned from the record 156*a* in producing this trace during a previous "recording" operation, it will be appreciated that the needle 228 may overlie a portion of either the metallized area 172*a* or 174*a*. Depending upon which metallized area the needle 228 is juxtaposed with respect to will influence the type of signal that is picked up by this needle 228. Whenever the needle is exactly over the trace 170*a* then the needle 228 will be subjected to a combination electric field condition produced by the out-of-phase components producing a null or neutral field effect, since the fields will, under these conditions, balance each other out as far as the needle is concerned.

Assuming for the moment, however, that the pickup head 222*a* is positioned somewhat toward the left from its pictured position so that the needle 228 is receiving excitation predominantly from the metallized area 172*a* and since the contacts 1E1 are normally closed, it can be seen from Figure 12 that this condition is transmitted to the grid 304 of the vacuum tube 258. Grid control so produced will influence the passage of current between the cathode 302 and the plate 300 and by reason of the cathode follower action, a signal derived from such an unbalanced condition will be transmitted via the conductor 290 through the contacts 3E1 to the conductor 292 connected to the input side of the amplifier 284. This error signal, detected as to phase and magnitude, produces an output from the amplifier 284 appearing as an actuating signal which is fed directly to the control winding of the A.C. servomotor 272 over the conductors 282.

The A.C. servomotor 272 rotates the gear train 270 in a direction to move the head 222*a* to the right, carrying therewith, of course, the needle 228. When the needle 228 has been moved so that it lies directly over the trace 170*a* the error being picked up and transmitted by the vacuum tube 258 will be of zero magnitude and hence there will be no further actuation of the A.C. servomotor 272. It will, of course, be appreciated that while this is happening the solenoid 252 remains deenergized and through the agency of the spring 256 the armature 254 is ejected sufficiently so as to engage the lower or downwardly extending arm 244 of the yoke 238. In this manner, the needle assembly 226 is pivoted in a clockwise direction so as to dispose the needle 228 approximately 0.010 inch from the record 156*a*. Thus there is no contact existing between the extremity of the needle 228 and the record 156*a* during this "playback" sequence.

Continuing with the playback operation such as we are concerned with in Figure 12, it is to be noted that the rotary potentiometer 356 is, at the time when the head 222*a* starts to move toward the right from its left position, rotated so that the brush arm 360 is picking up an electrical signal proportional to the amount that the needle 228 is displaced from a true central or null position with reference to the trace 170*a*. If the A.C. servomotor 204 is not driving the drum 150 at the correct speed, then, of course, the tachometer 362 is putting out a signal that is not in agreement with that coming from the potentiometer 356. Inasmuch as both of these signals, that is, the one coming from the rotary potentiometer 356 and the one coming from the tachometer 362, are fed to the amplifier 366, any lack of correspondence or unbalance will be submitted to this amplifier as an error signal and as such will be amplified and transmitted over the conductors 368 as an actuating signal for the control winding of the A.C. servomotor 204. For instance, if the drum speed is not as recorded by reason of the trace 170*a*, say, it is too slow, then the A.C. motor 204 will speed up to drive the drum 150 at a faster rate. Hence, should the dredge arm assembly 66 be overlying certain regions of the tub 20 where a different rate is desired, by either a speeding up or slowing down of the drum 150, it will be recognized that the part played by the other records, that is, the records 156*b*, 156*c*, 156*d*, 156*e*, 156*f*, and 156*g*, can be either accelerated or decelerated as the case may be. If the recording all takes place at a lower speed then, of course, the drum may be speeded up and operated at a faster rate during the whole "playback" operation by adjusting the resistor 359. On the other hand, if the rate of drum speed is varied during the "recording" process, then, of course, the rate variations will be reflected into the work-performing movements owing to the configuration of the trace 170*a* imparted to the record 156*a*.

Passing now to the dredge vibrate circuit F, the "playback" button 446 there depicted, upon depression, closes contacts 450 and these contacts serve to energize the relay 2F. First of all, the energization of the relay 2F closes its contacts 2F1, thereby applying power to the constant voltage winding of the A.C. servomotor 406 from the source labelled 508. Secondly, the relay 2F has incorporated thereon the contacts 2F2 which upon being moved into connection with the secondary of the transformer 452 apply 180° out-of-phase excitation voltage or field components to the record 156*b* in the same manner as was done by the contacts 2E2 of circuit E. Thirdly, the energization of this relay 2F is responsible for closing the contacts 2F3 and closure of these contacts furnish power via the conductor 484 to the rotary controller 478. If the brush arm 482 is in the pictured position, then, of course, none of the speed control relays 6F, 7F, 9F, 10F, or 11F, is energized and therefore the vibrate motor 88 will not operate. However, during recording, the dredge arm motor 88 was controlled, as far as its vibration rate is concerned, and during this playback sequence the brush arm 482 will be in wiping engagement with one of the contacts 480 in circuit with one of the above alluded to speed control relays to duplicate the recorded pattern of vibration.

Assuming that the needle 430 carried by the pickup head 222*b* is to one side of the trace 170*b*, an error signal is picked up and supplied to the vacuum tube 402 via the contacts 1F1 inasmuch as the relay 1F is not energized in the present instance. The unbalanced voltage relationship or disparity sensed by the needle 430 is fed to the amplifier 414 by cathode follower action over the conductor 420, the contacts 3F1, and the conductor 422. Any such signal is amplified after appropriate phase detection and impressed upon the control winding of the A.C. servomotor 406. The motor 406 then drives the gear train 404 in such a direction so as to bring the head 222*b* and its needle 430 into a null or neutral position. However, while this is taking plate it can be seen that the gear train 404 functions to drive the rotary controller 478 so as to position its brush arm 482 relative to any particular contact 480. Consequently, when the needle 430 has been moved into a null position, the brush arm 482 will rest upon one of the contacts 480 and the particular contact it rests upon will cause energization of its associated speed control relays 6F, 7F, 8F, 9F, 10F, and 11F, as the case may be. Through the tapped secondary of the transformer 492 the contacts associated with the energized speed control relay will supply appropriate A.C. voltage to the rectifier 494 and the rectified voltage will be supplied in turn to the motor 88. As was the case with respect to "manual" operation, the motor 88 rotates the cam 84 and the eccentricity of this cam is responsible for reciprocating the inner tube 76 and thus the screen 70, thereby determining the amount of enameling frit that will be deposited upon tub 20 at any given moment. Whenever continued rotation of the drum 150 brings a changed relationship of the trace 170*b* with respect to the head 222*b*, such a change will be immediately deflected through the system so as to modify the rate of dredge arm vibration. Thus, the particular rate will be varied just as it was during the earlier "recording" operation.

Coming now to the "playback" operation pertaining to circuit G of Figure 14, it is believed that this playback operation will be readily understood from a brief operation thereof. First of all, the playback button 568 is depressed, closing the contacts 699, and energizing the "playback" relay 2G. The contacts 2G1, carried by this playback relay, are closed with the energization of the relay and apply constant field excitation to the A.C. servomotor 502. In this connection it may be explained that the D.C. motor 554, previously used during both a "manual" and "record" operation is not utilized during a "playback" operation, reliance being made solely on the A.C. servomotor 502 for this accomplishment. Additionally, the relay 2G is equipped with contacts 2G2 which are in circuit with the vacuum tube 514 and the amplifier 510. In regard to the closing of the contacts 2G2 so as to deliver a signal transmitted from the vacuum tube 514 to the amplifier, it is to be noted that the contacts 1G1 remain in their upper position, inasmuch as the relay 1G is not energized by the foregoing action. Also, the solenoid 499 remains in a deenergized state. Still further, the relay 2G is provided with contacts 2G3 which are closed in unison with the other contacts on this relay, these last mentioned contacts connecting the transformer 698 to the record 156c via the spring biased contacts 168 riding against the record 156c. As was the case with respect to the records 156a and 156b, an out-of-phase voltage is applied to the record 156c so that the needle 522 carried by the head 222c can detect phase differences and the magnitudes of such differences caused by the relative transverse position of this needle with respect to the trace 170c.

Assuming, for the sake of discussion, that the needle 522 depicted in circuit G is to the left of the trace 170c, calling for, say, an upward movement of the dredge arm assembly 66, this displaced position of the needle will impress a voltage on the grid of the tube 514, and through cathode follower action a derivative of this signal is transmitted as an error signal to the amplifier 510. After phase detection and amplification within the amplifier 510, the output from this amplifier is fed over the conductors 508 as an actuating signal for the control winding of the A.C. servomotor 502. Inter-field action within the A.C. servomotor 502 is responsible for driving this motor in either direction and at the appropriate speed so as to correct the displace position of the needle 522. Consequently, the gear train 500 is actuated so as to move the entire head 222c to the right.

Prior to the restoring of the head 222c to a null position, it can be discerned that the synchro control transformer 540 meshed with the gear train 500 will develop a signal which is in disagreement with the synchro transmitter 534. Remembering that the synchro transmitter 534 is moved in accordance with the load, in this instance, the dredge arm assembly 66, it will be appreciated that the error signal developed between the components 534 and 540 when amplified by the amplifier 544 and fed as an actuating signal to the servomotor 546, will modify the position of the control valve at the A-end of the combination variable displacement oil pump and constant displacement oil motor designated in its entirety by the reference numeral 528. With a change taking place as far as the output from the oil pump or A-end of the conbination 528 is concerned, the constant displacement oil motor or B-end of the combination 528 is driven at the appropriate speed so as to alter the elevation of the dredge arm assembly 66. As was the case with respect to the "manual" and "record" operation, the driving mechanism 122, of which the combination 528 is a part, positions the dredge arm assembly 66 vertically in the same mechanical manner as was done in these earlier described operations, and consequently, it is not believed necessary to trace through this mechanical drive again. However, when a null relationship between the needle 522 and the trace 170c is restored, then, of course, the driving mechanism 122 stops functioning and the dredge arm assembly 66 is brought to rest. When another change, due to the recorded configuration of the trace 170c, occurs, then the action is repeated so as to always move the needle 522 toward a null position relative to this trace 170c. Of course, whenever a disagreement or disparity prevails, then the load 66 is moved in a direction dictated by the difference existing between the needle 522 and its cooperable trace 170c by reason of the associated difference in electrical field conditions.

Figures 2, 3:
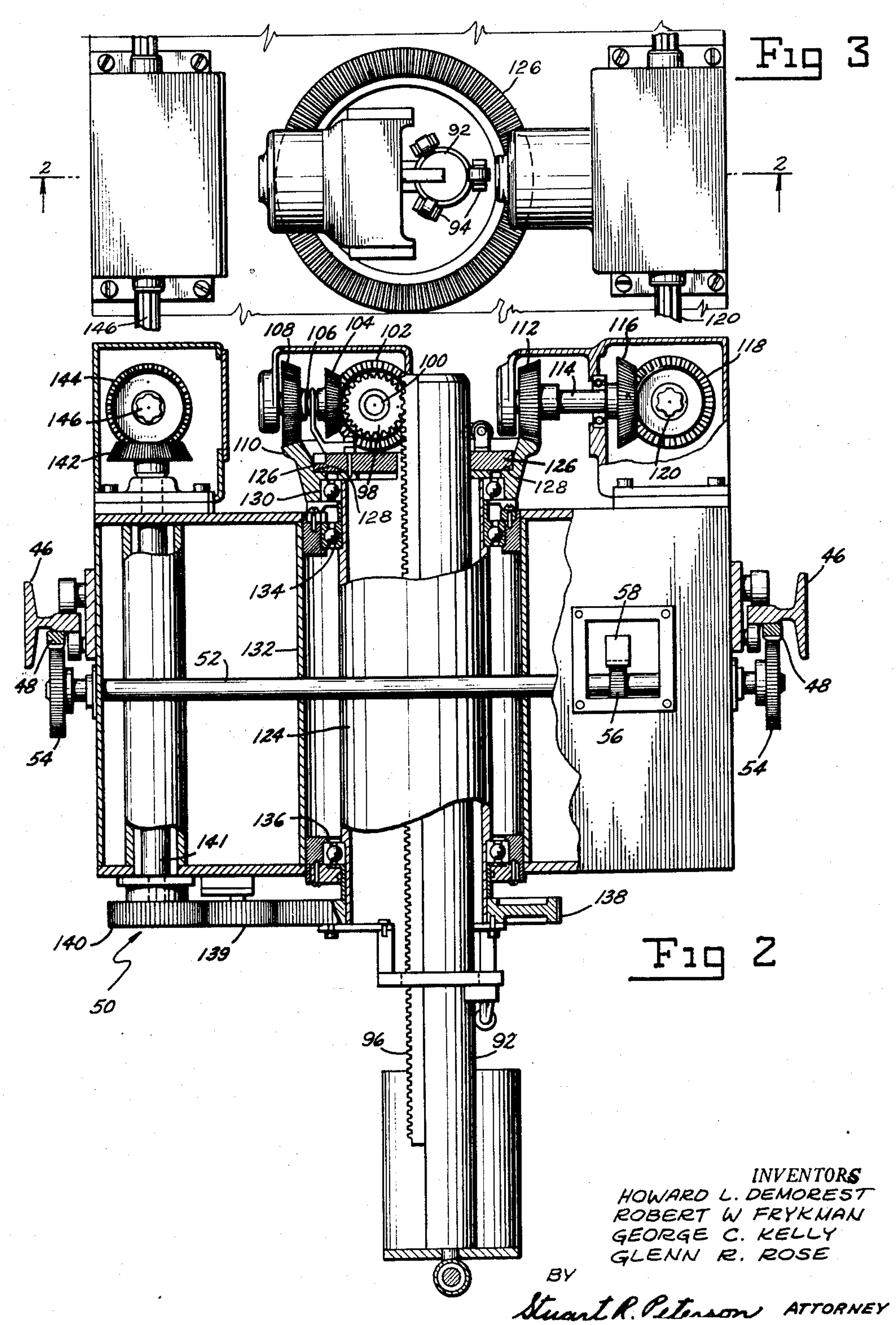
Figure 2 is a sectional view of the carriage assembly taken in the direction of line 2—2 of Figures 1 and 3.
Figure 3 is a fragmentary plan view depicting the structure in the zone immediately adjacent the region where the lines 2—2 is taken.

Owing to the fact that the records 156*d*, 156*e*, 156*f*, and 156*g* involve duplicate circuitry G, it is not deemed necessary to explain the "playback" operation stemming from the use of these various records. Actually, the presentation of duplicate circuitry has been avoided for the sake of simplicity. However, it may be mentioned in passing that the trace 170*d* cooperates with a pickup needle on the pickup head 222*d* to control the driving mechanism 144 in order to swing the dredge arm assembly 66 about the vertical axis provided by the column 124 (Figure 2). Similarly, the trace 170*e* coacting with the head 222*e* is entrusted with the duty of moving the carriage 50 back and forth in a horizontal direction and to this end the head 222*e* controls the driving mechanism 64. Likewise, the trace 170*f* establishes a routine or pattern for the head 222*f* which serves to control the driving mechanism 32 and hence the degree of tub tilt about a horizontal axis afforded by the shaft sections 36 and 38 (Figure 5). Futher, the trace 170*g* is intended to influence the position of the head 222*g* and simultaneously control the driving mechanism 42, which driving mechanism rotates the tub about a horizontal position, this being by way of the shaft 30 (Figure 5).

Because the common relay 1C has contacts 1C1E, 1C1F and 1C1G in circuit with the "playback" relays 2E, 2F and 2G, respectively, energization of the common relay (by depressing the button 332) will deenergize the relays 2E, 2F and 2G, concomitantly, the various "manual" relays 4E, 4F and 4G will be energized to permit "manual" operation. Consequently, it will be recognized that the common relay 1C transfers control just as it does (and explained) in conjunction with a "record" operation. Depressing the common switch button 334 will transfer control back after the operator has completed any manual maneuverings during the interrupted interval.

Earlier in the description, mention was made concerning the employment of what was termed phase one and phase two operation. At this time, an additional word should be said with respect to these phase operations for while provision is made through the agency of cams 212 and 214 for the predetermined establishment of a starting position of the drum 150, nonetheless, after having made a recording it will be necessary if the recorded trace does not extend for the full encircled length of the record to extend the trace to the end or to both sides so as to isolate completely the metallized areas adjacent to the trace. Consequently, if only a phase one operation or, say, perhaps a fraction of a phase one operation is performed, then the trace must be extended in a straight line fashion to the opposite end of the record or in a T formation to the sides, thereby dividing the record into two phase excitable metallized areas with no electrical communication therebetween. It is believed obvious that this has to be done in order to preserve the out-of-phase relationship as far as the excitation applied to the various records is concerned.

By means of the automatic stop button 374 the drum 150 may be stopped at any time because the relay 6E will thereby be deenergized to drop out the contacts 6E3. At the conclusion of an enameling operation, the various "off" buttons 312, 440 and 560 should also be actuated to deenergize whatever relays that might be energized through the several mechanically interlocked selector switch units 310, 438 and 558.

From the foregoing it will be appreciated, it is believed, that the invention has presented a method for obtaining various work-performing motions in an entirely automatic manner and that sufficient apparatus has been described which will permit the accomplishing and realization of these work-performing movements in a facile and economical way. Furthermore, the invention results in the production of records having a high degree of permanence, entailing absolutely no wear from innumerable "play-back" operations. Also, specifically speaking, it is to be observed that in performing enameling operations automatically, sufficient apparatus has been pictured which will serve to cover completely the surfaces of a bathtub and, of course, the apparatus may be readily modified to permit its use in conjunction with the enameling of other items. Still further, it is thought that the apparatus is susceptible to use in other environments. Therefore, as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. Control apparatus comprising means for movably supporting a record having a metallized surface on a relatively insulating base, a pick-up head movable relative to said record including a needle, means for passing a writing current through said needle when said needle is in engagement with said metallized surface to burn a trace thereon, means for applying out-of-phase voltage components to the metal areas on either side of the trace after completion of said trace when said needle is spaced from said record, and circuit means connectable to said needle for sensing differences in field conditions produced by said voltage components for tracking said needle with respect to said trace as said record is moved by said supporting means.

2. Apparatus for effecting predetermined work motions comprising a record having a metallized surface and a relatively non-conducting base, portions of said surface being removed to expose said base in the form of an analog trace representative of derivatives of various desired work motions, said trace separating said metallized surface into two electrically conductive areas, means for electrically energizing said conductive areas to provide out of phase electromagnetic field conditions, and a pick-up head spaced from said record and sensitive to said field conditions to seek a null position between said conductive areas and thus with respect to said trace.

3. Apparatus for effecting predetermined work motions comprising a record having a metallized surface and a relatively non-conducting base, portions of said surface being removed to expose said base in the form of an analog trace representative of derivatives of various desired work motions dividing said surface into two metallized areas, means for electrically energizing said two metallized areas to provide out of phase electromagnetic field conditions, a work performing member, means for actuating said work performing member, and pick-up means including an element spaced somewhat from said trace and said metallized areas adjacent thereto for controlling said actuating means, said element being electrically sensitive to electric field conditions produced by the electrical energization of said unremoved metallized surface and means for constraining pick-up means to follow said trace.

4. Apparatus for effecting predetermined work motions comprising a record blank of metallized insulation, a pick-up head provided with a needle element, said pick-up head being disposed for traversal of said record blank between opposite edges thereof, means for moving said blank relative to said head, means for urging said head in the direction of said blank to cause contact between said needle element and blank, circuit means for passing sufficient current through said needle element to vaporize a limited quantity of metal from said blank when said needle element is in contact with the blank, a movable work performing member, means moving said head in relation to movements of said work performing member to cause an analog trace to be formed on said record blank which trace separates the metallized surface into two areas, means for retracting said head sufficiently so as to space said needle element somewhat from the record, circuit means for applying out-of-phase voltages to said separated areas, circuit means associated with said needle element for sensing electric field conditions resulting from said out-of-phase voltages, motor means controlled by said last mentioned means for actuating said work performing means to duplicate substantially the recorded movements of said members, and feed back means responsive to positions of said work performing member for actuating said pick-up head toward a null position relative to the trace on said record.

5. Apparatus in accordance with claim 4 in which said retraction means includes a spring and said contact urging means includes a solenoid for overcoming the action of said spring when said solenoid is energized.

6. Apparatus for effecting predetermined work motions comprising a record of metalized insulation having a metal-removed trace thereon in analog form representative of derivatives of various desired work motions, a pick-up head provided with a projecting needle end, said pick-up head being disposed for traversal of said record with said needle end spaced somewhat from the surface thereof, means for moving said record relative to said head, means for electrically energizing said record so that the metallized areas thereof on either side of said trace have electrically distinguishable characteristics detectable by said needle, a work performing member, motor means for actuating said work performing member, means in circuit with said pick-up head sensitive to said electrically distinguishable characteristics for controlling said motor means in accordance with relative deviations from null positions of said needle with respect to said trace to effect predetermined work motions of said work performing member, and feed back means responsive to positions of said work performing member for actuating said pick-up head toward a null position relative to the trace on said record.

7. Apparatus in accordance with claim 6 in which said energizing means supplies out-of-phase alternating electrical fields to said metallized areas, and said circuit means is responsive to said fields to control the direction of movement of said motor means and hence the path of said work performing member.

8. Apparatus for effecting predetermined work motions comprising means for supporting a record on which derivatives of desired work motions are to be recorded, a needle assembly coactable with said supporting means, first resilient means biasing the needle assembly in a direction toward said supporting means to apply the proper amount of recording pressure against a record supported by said supporting means, second resilient means for overcoming the biasing action of said first resilient means to move said needle assembly away from the supporting means, and solenoid means for rendering said second resilient means ineffectual to permit said first resilient means to move the needle assembly in the direction of said supporting means.

9. Apparatus in accordance with claim 8 including first electrical means for energizing said needle assembly when the first resilient means is effective and second electrical means associated with the needle assembly for sensing electric field conditions when said second resilient means is effective.

10. Apparatus in accordance with claim 9 including adjustable stop means for determining the spacing of said needle assembly from the record supporting means when said second resilient means is effective.

11. Apparatus for effecting predetermined work motions comprising means for supporting a record on which derivatives of desired work motions are to be recorded, a recording and pick-up head movable relative to the supporting means including a pivotal yoke member equipped with a laterally extending arm and a downwardly extending arm, a needle assembly mounted on the yoke member for movement toward and away from the supporting means as the yoke member is pivoted, first spring means engaging said laterally extending arm to move the needle assembly in a direction toward said supporting means, a solenoid having an armature engageable with said downwardly extending arm, and second spring means urging the armature against said downwardly extending arm when the solenoid is de-energized, said second resilient means having a greater spring constant than said first spring means so as to result in movement of the needle assembly away from the supporting means and energization of the solenoid being sufficient to retract said armature from the downwardly extending arm to permit the first spring means to move the needle assembly in the direction of said supporting means.

12. Apparatus in accordance with claim 11 in which the supporting means comprises a rotary drum and the recording head is mounted on a guide rod for transverse movement with respect thereto.

13. Apparatus in accordance with claim 12 in which said drum has a longitudinal groove, the apparatus including means for assuring de-energization of the solenoid whenever the groove has been brought into juxtaposition with the needle end of said needle assembly.

14. Apparatus in accordance with claim 13 in which the de-energization means includes a cam rotated in unison with the drum and a cam switch actuated thereby for causing said de-energization.

15. In apparatus for effecting predetermined work motions, a movable record having recorded thereon derivatives of a desired rate of record movement, first motor means for moving the record under the control of said record, and second motor means for moving the record at an accelerated rate to position initially the record for the start of a controlled operation involving the record and said first motor means.

16. In apparatus for effecting predetermined work motions, a rotatable drum, a record on said drum having recorded thereon derivatives of a desired schedule of rates of drum movement, first motor means for rotating the record under the control of said record, second motor means for rotating the drum at an accelerated rate, and cam means rotatable with the drum for stopping said second motor means at a preferred angle of rotation of the drum for the start of a controlled operation of said drum involving the record and said first motor means.

17. Apparatus in accordance with claim 16 including circuit means for assuring de-energization of said first motor means when operating said second motor means.

18. Apparatus for controlling the speed of a record comprising a record having recorded thereon derivatives of a desired schedule of record speeds, pick-up means associated with said record for sensing changes in the recorded derivatives, first motor means for moving said pick-up means toward a null position with respect to the record, said first motor means being controlled in accordance with any error signal sensed by said pick-up means, means moved by said first motor means for producing a signal representative of the physical position that said pick-up means is in at a given moment, second motor means for driving said record, means moved by said second motor means for producing a signal representative of the rate of movement of said record at the same given moment, and means responsive to the signal producing means moved by said first motor means and the signal producing means moved by said second motor means for controlling said second motor means in accordance with the difference between signals developed by the two signal producing means.

19. Apparatus in accordance with claim 18 in which the record has a metallized surface thereon and has a relatively insulating trace formed by removal of metal from said surface along an analog path representative of said derivatives, said pick-up means including a needle and an associated circuit sensitive to different field conditions imposed on the metal areas to either side of said trace, any unbalanced field conditions to which the needle is exposed producing the aforementioned error signal.

20. Apparatus for effecting predetermined speeds of a record comprising a rotatable drum, a record carried on the drum having a metallized surface and a relatively insulating base, first motor means for driving said drum, a pick-up head disposed for movement transverse to the record, a needle assembly pivotally supported on said head including a needle engageable with the record, resilient means normally biasing the needle assembly so that the needle is spaced from the record, solenoid means for effecting pivotal movement of the needle assembly in a direction toward the record to establish contact between said needle and the record's metallized surface for a recording operation when said solenoid means is energized, first switch means for energizing the solenoid means to cause contact between the needle and record, means in circuit with the needle for applying a writing voltage thereto, second motor means for moving said head in accordance with derivatives of desired drum speeds to produce an analog trace by removing a metallic path from the record, second switch means interrelated with said first switch means so as to cause said first switch means to de-energize the solenoid means to withdraw the needle from the record, said second switch means applying out-of-phase voltage components to the metal areas on either side of said trace, circuit means associated with the pick-up head for detecting differences in field conditions caused by relative displacement of the needle and head with respect to said trace to control said second motor means so as to move said head toward a null position relative to said trace, first signal means driven by said second motor means for producing a signal representative of the physical position of said head, second signal means driven by said first motor means for producing a signal representative of the speed of the drum, and means for controlling the speed of the first motor means in accordance with any difference between the signals from said first and second signal producing means, whereby drum speeds are realized which are dependent upon the trace formed during a recording operation.

21. In apparatus for performing enameling operations automatically, a dredge arm, means for vibrating said dredge arm, a record having recorded thereon derivatives of a desired schedule of vibration rates, pick-up means associated with said record for sensing changes in the recorded derivatives, motor means for moving said pick-up means toward a null position with respect to the record, said motor means being controlled in accordance with any error signal sensed by said pick-up means, and controlling means actuated by said motor means for driving said vibrating means at a speed in accordance with the position of said pick-up means.

22. In apparatus for performing enameling operations automatically, a dredge arm, motor means for vibrating said dredge arm, a rotatable drum, a record on said drum having an insulating base and a metallic surface with an analog trace formed on said surface which trace is representative of derivatives of a desired schedule of vibration rates, a pick-up head disposed for movement transverse to the record including a needle, circuit means associated with said needle sensitive to different field conditions imposed on the metal areas to either side of said trace, motor means controlled by said circuit means for moving the pick-up head and its needle toward a null position, and motor controlling means for the vibrating motor means moved by said circuit controlled motor for determining the speed of said vibrating motor means in accordance with the trace on said record.

23. Apparatus in accordance with claim 22 in which said motor controlling means includes a rotary brush arm and brush contacts wiped by said brush arm as said arm is rotated by the circuit controlled motor means.

24. In apparatus for performing enameling operations automatically, a dredge arm, first motor means for vibrating said dredge arm, a rotatable drum, a record on said drum having an insulating base and a metallic surface, a pick-up head disposed for movement transverse to the record, a needle assembly pivotally supported on said head including a needle engageable with the record, resilient means normally biasing the needle assembly so that the needle is spaced from the record, solenoid means for effecting pivotal movement of the needle assembly in a direction toward the record to establish contact between said needle and the record's metallized surface for a recording operation when said solenoid means is energized, first switch means for energizing the solenoid means to cause contact between the needle and record, means in circuit with the needle for applying a writing voltage thereto, second motor means for moving said head in accordance with derivatives of desired vibration rates to produce an analog trace by removing a metallic path from the record, second switch means interrelated with said first switch means so as to cause said first switch means to deenergize the solenoid means to withdraw the needle from the record, said second switch means applying out-of-phase voltage components to the metal areas on either side of said trace, circuit means associated with the pick-up head for detecting differences in field conditions caused by relative displacement of the needle and head with respect to said trace to control said second motor means so as to move said head toward a null position relative to said trace, and motor controlling means for the vibrating motor means driven by said second motor means determining the speed of said vibrating motor means in accordance with the trace on said record.

25. Apparatus for effecting predetermined work motions comprising means for performing desired work motions, a metallized record having recorded thereon derivatives of a desired schedule of work performing motions in the form of an insulated trace flanked by metal areas, electrical pick-up means spaced from said record for sensing changes in the recorded derivatives when said record is subjected to out of phase field conditions, motor means for moving said pick-up means toward a null position with respect to the record, said motor means being controlled in accordance with any error signal sensed by said pick-up means, and motor controlling means actuated by said motor means for driving said work performing means in accordance with the position of said pick-up means.

26. An apparatus for performing enameling operations automatically, a dredge arm, first motor means for moving said dredge arm, a rotatable drum, a record on said drum having an insulating base and a metallic surface, a pick-up head disposed for movement transverse to the record, a needle assembly pivotally supported on said head including a needle engageable with the record, resilient means normally biasing the needle assembly so that the needle is spaced from the record, solenoid means for effecting pivotal movement of the needle assembly in a direction toward the record to establish contact between said needle and the record's metallized surface for a recording operation when said solenoid means is energized, first switch means for energizing the solenoid means to cause contact between the needle and record, means in circuit with the needle for applying a writing voltage thereto, second motor means for moving said head in accordance with derivations of desired dredge arm movements by removing a metallic path from the record, second switch means interrelated with said first switch means so as to cause said first switch means to de-energize the solenoid means to withdraw the needle from the record, said second switch means applying out-of-phase voltage components to the metal areas on either side of said trace, and motor controlling means for said first motor means driven by said second motor means determining the dredge arm movements in accordance with the trace on said record.

27. An apparatus for performing enameling operations automatically, a dredge arm mounted for movement with respect to a fixture adapted to hold an article to be enameled, first motor means for moving said dredge arm, a rotatable drum having an insulating base and a metallic surface, means for rotating said drum at a preferred speed, a pick-up head disposed for movement transverse to the record including a needle, means moving said pick-up head either in the direction of the record to establish contact between the needle and the record's metal surface or to space said needle from said metal surface, second motor means for moving said head relative to the record when the needle is in contact with same to make a recorded trace on said record, a slave synchro driven by said second motor means, a command synchro driven in accordance with the position of said dredge arm, means for detecting and amplifying differences existing between said synchros, means associated with said amplifying means for controlling said first motor means for driving the dredge arm in such a direction so as to nullify differences between said synchros, circuit means applying out-of-phase electric field components to the metal areas on either side of the trace when the needle is spaced from the record's surface, means for detecting any error signal developed due to the needle being to either side of the trace, means for amplifying such error signal, and third motor means controlled said last mentioned amplifying means for driving said head and its needle toward a null position with respect to said trace during a playback operation.

28. Apparatus in accordance with claim 27 including means for moving said fixture and hence the article held thereby according to a preferred schedule during a playback operation.

29. Apparatus for performing enameling operations comprising a frame, a carriage movable horizontally along said frame, a dredge arm, means associated with the carriage for constraining said dredge arm for vertical movement relative thereto, means also associated with the carriage for constraining said dredge arm for horizontal movement relative thereto, a first driving mechanism for moving said carriage horizontally along said frame, a second driving mechanism for raising and lowering said dredge arm, a third driving mechanism for effecting horizontal movement of the arm with respect to said carriage, and manually actuatable control means for governing said several driving mechanisms so as to effect a combination of dredge arm movements in a plurality of directions.

30. Apparatus in accordance with claim 29 including means for obtaining derivatives of the various carriage and dredge arm movements, and respective means for recording said derivatives for use in a subsequent playback operation.

31. Apparatus for performing enameling operations comprising a frame, a carriage movable horizontally along said frame, a dredge arm, means associated with the carriage for constraining said dredge arm for vertical movement relative thereto, means also associated with the carriage for constraining said dredge arm for horizontal movement relative thereto, a first driving mechanism for moving said carriage horizontally along said frame, a second driving mechanism for raising and lowering said dredge arm, a third driving mechanism for effecting horizontal movement of the arm with respect to said carriage, a rotatable drum, a plurality of records, one for each driving mechanism, encircling said drum, each record having a metallized surface thereon and a recorded trace substantially non-conducting in character which traces are collectively representative of the several movements desired of said carriage and dredge arm in performing an enameling operation, means for exciting the metal areas of each record with out-of-phase voltage components, and respective pick-up heads for sensing differences in field conditions when any head is at a position different from a null one relative to its associated trace, and control means associated with each head and a driving mechanism for controlling the operation of its associated driving mechanism in accordance with the position of that head.

32. Apparatus in accordance with claim 31 including a fixture for holding an item to be enameled, means for rotating said fixture in a vertical plane, means for rotating said fixture in a horizontal plane, a fourth driving mechanism for accomplishing the vertical rotation, a fifth driving mechanism for accomplishing the horizontal rotation, further records on said drum, one for said fourth and one for said fifth driving mechanisms, corresponding to those records constituting said plurality of records, and additional pick-up heads and respective control means for controlling the operation of said fourth and fifth driving mechanisms in accordance with the positions of their associated heads.

33. Apparatus in accordance with claim 32 including motor means for vibrating said dredge arm, a record on said drum having a trace representative of desired vibration rates, a pick-up head associated with said last mentioned head, and further control means for controlling the vibrating motor means in accordance with the position of its head.

34. Apparatus in accordance with claim 33 including means for manualy controlling the various driving mechanisms, means for obtaining derivatives of the movements of said carriage, dredge arm and fixture, and means utilizing said derivatives in producing the various record traces.

35. Apparatus in accordance with claim 34 including needle means on each head, and a source of writing voltage connected to said needle for removing metal by vaporization in the production of said traces.

36. In apparatus for effecting predetermined work motions a rotary drum having a longitudinal groove, means disposed in said groove for clamping the opposite ends of a foil-type record encircling said drum, a pair of resilient contact arms supported in cantilever fashion at a locus defined by said groove, conductor means extending from said resilient arms to the interior of said drum, a slip ring assembly journaled for rotation independently of said drum, said conductor means being electrically connected to said slip ring assembly, a clutch, and electrical disconnect means associated with said clutch for connecting and disconnecting the slip ring assembly in circuit with said resilient contact arms.

References Cited in the file of this patent

UNITED STATES PATENTS

| | | |
|---|---|---|
| 710,443 | Dupont | Oct. 7, 1902 |
| 759,351 | Dawes | May 10, 1904 |
| 912,181 | Schattner | Feb. 9, 1909 |
| 939,918 | Lindsay | Nov. 9, 1909 |
| 1,905,838 | Flueler | Apr. 25, 1933 |
| 2,025,467 | Lovell et al. | Dec. 24, 1935 |
| 2,213,108 | Pollard | Aug. 27, 1940 |
| 2,266,273 | Schiff | Dec. 16, 1941 |
| 2,286,571 | Pollard | June 16, 1942 |
| 2,475,245 | Leaver et al. | July 5, 1949 |
| 2,530,029 | Pond | Nov. 14, 1950 |
| 2,573,303 | Bozoky | Oct. 30, 1951 |
| 2,574,104 | Ireland | Nov. 6, 1951 |
| 2,582,073 | Schudder | Jan. 8, 1952 |
| 2,588,386 | Hubbard et al. | Mar. 11, 1952 |
| 2,611,115 | Johnston | Sept. 16, 1952 |
| 2,628,539 | De Neergaard | Feb. 17, 1953 |
| 2,679,622 | Deri | May 25, 1954 |
| 2,729,453 | Camras | Jan. 3, 1956 |